United States Patent
Aimura et al.

(10) Patent No.: US 8,242,897 B2
(45) Date of Patent: Aug. 14, 2012

(54) VEHICLE ENVIRONMENT MONITORING APPARATUS

(75) Inventors: Makoto Aimura, Saitama (JP); Hideki Hashimoto, Saitama (JP); Masakazu Saka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 12/608,321

(22) Filed: Oct. 29, 2009

(65) Prior Publication Data

US 2010/0156616 A1 Jun. 24, 2010

(30) Foreign Application Priority Data

Dec. 22, 2008 (JP) .................. 2008-325958

(51) Int. Cl.
*B60Q 1/00* (2006.01)

(52) U.S. Cl. .......... 340/436; 340/438; 340/937

(58) Field of Classification Search .......... 340/436, 340/438, 425.5, 903, 933, 937; 348/148
See application file for complete search history.

(56) References Cited

U.S. PATENT DOCUMENTS

| | | | |
|---|---|---|---|
| 6,327,536 B1 | 12/2001 | Tsuji et al. | |
| 6,690,268 B2 * | 2/2004 | Schofield et al. | ............. 340/438 |
| 7,548,634 B2 | 6/2009 | Kudo | |
| 2008/0089557 A1 | 4/2008 | Iwaki et al. | |
| 2009/0122136 A1 | 5/2009 | Shiraishi et al. | |

FOREIGN PATENT DOCUMENTS

| | | |
|---|---|---|
| EP | 1 564 703 A1 | 8/2005 |
| EP | 1 901 225 A1 | 3/2008 |
| EP | 1 909 064 A1 | 4/2008 |
| JP | 2001-006096 | 1/2001 |
| JP | 2001-169310 A | 6/2001 |
| JP | 2006-318060 A | 11/2006 |

* cited by examiner

*Primary Examiner* — Daryl Pope
(74) *Attorney, Agent, or Firm* — Carrier Blackman & Associates, P.C.; Joseph P. Carrier; William D. Blackman

(57) ABSTRACT

A vehicle environment monitoring apparatus is equipped with a monitored object detecting unit 26 which detects an object having possibility of contact by applying an object detecting algorithm for short range when the distance calculated from data on one disparity by the first distance calculating unit 24 is equal to or less than a predetermined distance, and detects the object having possibility of contact by applying an object detecting algorithm for long range when the distance is longer than the predetermined distance, using the distance between the object and the vehicle calculated from a disparity gradient by the second distance calculating unit 25.

16 Claims, 18 Drawing Sheets

VEHICLE ENVIRONMENT MONITORING APPARATUS

BACKGROUND OF THE INVENTION

1. Field of the Invention

The present invention relates to a vehicle environment monitoring apparatus which monitors the environment of the vehicle on the basis of the images taken by the imaging unit mounted on the vehicle.

2. Description of the Related Art

Conventionally, there is known a configuration of detecting an object existing in the surroundings of a vehicle by a so-called stereo camera in which two cameras are mounted with their optical axes parallel to each other, and calculating a distance between the object and the vehicle using a disparity, by calculating the disparity from the image area within the image from the right camera and the image area within the image from the left camera with respect to the identical object. And there is proposed a vehicle environment monitoring apparatus which determines the possibility of contact between the object and the vehicle, on the basis of the distance between the object and the vehicle calculated using the disparity (for example, refer to Japanese Patent Laid-Open No. 2001-6069).

When detecting the object existing in the range up to a long range, for example exceeding 100 m, from short range in the vicinity of the vehicle by the algorithm disclosed in Japanese Patent Laid-Open No. 2001-6069, the influence of the variation in the optical axes of the two cameras increase for detecting the object existing at a long range, so that the error in the calculated distance becomes large. Therefore, it was difficult to determine stably the possibility of contact between the object and the vehicle for all the range from short range to long range.

SUMMARY OF THE INVENTION

In view of such circumstances, an object of the present invention is to provide a vehicle environment monitoring apparatus capable of detecting an object having possibility of contact in all the range from short range from the vicinity of the vehicle to long range, at a stable detecting timing.

In order to achieve the above object, the present invention provides a vehicle environment monitoring apparatus which monitors an environment around a vehicle, using images obtained from at least one imaging unit mounted on the vehicle.

In the first embodiment of the present invention, the vehicle environment monitoring apparatus is comprised of an object extracting unit which extracts from the image an image area of an object in the real space; a first distance calculating unit which calculates a distance between the vehicle and the object; and a monitored object detecting unit which detects an object having a possibility of coming into contact with the vehicle using an object detecting algorithm for short range, when the distance calculated by the first distance calculating unit is equal to or less than a predetermined distance, and which detects the object having the possibility of coming into contact with the vehicle using an object detecting algorithm for long range, when the distance calculated by the first distance calculating unit is longer than the predetermined distance.

According to the present invention, the monitored object detecting unit detects the object having the possibility of coming into contact with the vehicle by applying the object detecting algorithm for short range, when the distance between the vehicle and the object calculated by the first distance calculating unit is equal to or less than the predetermined distance. Further, when the distance is longer than the predetermined distance, the monitored object detecting unit detects the object having the possibility of coming into contact with the vehicle by applying the object detecting algorithm for long range.

By doing so, it becomes possible to detect with accuracy the object having the possibility of coming into contact with the vehicle, by applying the object detecting algorithm for short range targeted at pedestrian, bicycle or the like in the range of short distance, and by applying the object detecting algorithm for long range targeted at large animal or the like in the range of long distance. Therefore, it becomes possible to detect the object having possibility of contact in all the range from short range in the vicinity of the vehicle to long range, at a stable detecting timing.

Further, the vehicle environment monitoring apparatus of the present invention comprises a disparity calculating unit which calculates a disparity between the image areas of the identical object extracted by the object extracting unit from each image taken at the same time by the two imaging units; a disparity rate of change calculating unit which calculates a disparity rate of change per predetermined time from the data of the disparity calculated in time series by the disparity calculating unit for the identical object in real space; a velocity detecting unit which detects a velocity of the vehicle; and a second distance calculating unit which calculates the distance between the vehicle and the object on the basis of the disparity rate of change and the velocity of the vehicle; wherein the first distance calculating unit calculates the distance between the vehicle and the object from the data of one disparity calculated by the disparity calculating unit; and the monitored object detecting unit detects the object having the possibility of coming into contact with the vehicle using the distance between the vehicle and the object calculated by the second distance calculating unit in the object detecting algorithm for long range.

According to the present invention, it becomes possible to detect the object having the possibility of coming into contact with the vehicle while restricting the calculation error of the distance between the vehicle and the object in the range of long distance, by calculating the distance between the vehicle and the object by the second distance calculating unit on the basis of the disparity rate of change.

Further, the present invention is characterized in that the monitored object detecting unit detects the object having the possibility of coming into contact with the vehicle by applying both of the object detecting algorithm for short range and the object detecting algorithm for long range, when a difference between the distance calculated by the first distance calculating unit and the predetermined distance is within a predetermined range.

According to the present invention, it becomes possible to restrain the occurrence of overlook of the object, by detecting the object having the possibility of coming into contact with the vehicle by applying both of the object detecting algorithm for short range and the object detecting algorithm for long range, in the vicinity of the predetermined distance at which it is difficult to distinguish the type of the object.

Further, the present invention comprises a velocity detecting unit for detecting a velocity of the vehicle, and is characterized in that the monitored object detecting unit detects the object having the possibility of coming into contact with the vehicle by applying the object detecting algorithm for short range when the detected velocity by the velocity detecting unit is equal to or slower than a predetermined velocity, and which detects the object having the possibility of coming into contact with the vehicle by applying the object detecting algorithm for long range when the detected velocity by the velocity detecting unit is faster than the predetermined velocity.

According to the present invention, it is possible to switch the application of the object detecting algorithm for short range and the object detecting algorithm for long range while adding the allowance with respect to the approach to the object, by using the velocity of the vehicle.

Further, the present invention is characterized in that the monitored object detecting unit detects the object having the possibility of coming into contact with the vehicle by applying both the object detecting algorithm for short range and the object detecting algorithm for long range, when a difference between the detected velocity by the velocity detecting unit and the predetermined velocity is within a predetermined range.

According to the present invention, it becomes possible to restrain the occurrence of overlook of the object, by detecting the object having the possibility of coming into contact with the vehicle by applying both of the object detecting algorithm for short range and the object detecting algorithm for long range, in the vicinity of the predetermined velocity at which it is difficult to distinguish the type of the object.

Further, the present invention is characterized in that the monitored object detecting unit continues the process by the object detecting algorithm for short range even when the detected distance by the first distance calculating unit becomes longer than the predetermined distance, when detecting the object having the possibility of coming into contact with the vehicle by applying the object detecting algorithm for short range to the image at a predetermined point in time.

According to the present invention, it becomes possible to prevent the delay in the detecting timing of the object having the possibility of coming into contact with the vehicle by interrupting the object detecting algorithm for short range.

Further, the present invention is characterized in that the monitored object detecting unit continues the process by the object detecting algorithm for long range even when the detected distance by the first distance calculating unit becomes equal to or less than the predetermined distance, when detecting the object having the possibility of coming into contact with the vehicle by applying the object detecting algorithm for long range to the image at a predetermined point in time.

According to the present invention, it becomes possible to prevent the delay in the detecting timing of the object having the possibility of coming into contact with the vehicle by interrupting the object detecting algorithm for long distance.

In the second embodiment of the present invention, the vehicle environment monitoring apparatus comprises an object extracting unit which extracts from the image an image area of an object in the real space; a velocity detecting unit which detects a velocity of the vehicle; and a monitored object detecting unit which detects the object having the possibility of coming into contact with the vehicle using an object detecting algorithm for short range, when the detected velocity by the velocity detecting unit is equal to or less than a predetermined distance, and which detects the object having the possibility of coming into contact with the vehicle using an object detecting algorithm for long range, when the detected velocity by the velocity detecting unit is higher than the predetermined velocity.

According to the present invention, the monitored object detecting unit detects the object having the possibility of coming into contact with the vehicle by applying the object detecting algorithm for short range, when the velocity of the vehicle detected by the velocity detecting unit is equal to or less than the predetermined velocity. Further, when the velocity is faster than the predetermined velocity, the monitored object detecting unit detects the object having the possibility of coming into contact with the vehicle by applying the object detecting algorithm for long range.

By doing so, it becomes possible to detect with accuracy the object having the possibility of coming into contact with the vehicle, by applying the object detecting algorithm for short range targeted at pedestrian, bicycle or the like in a low-speed range, and by applying the object detecting algorithm for long range targeted at large animal or the like in a high-speed range. Therefore, it becomes possible to detect the object having possibility of contact in all the range from low-speed range to the high-speed range, at a stable detecting timing.

DETAILED DESCRIPTION OF THE PREFERRED EMBODIMENTS

Figure 1:
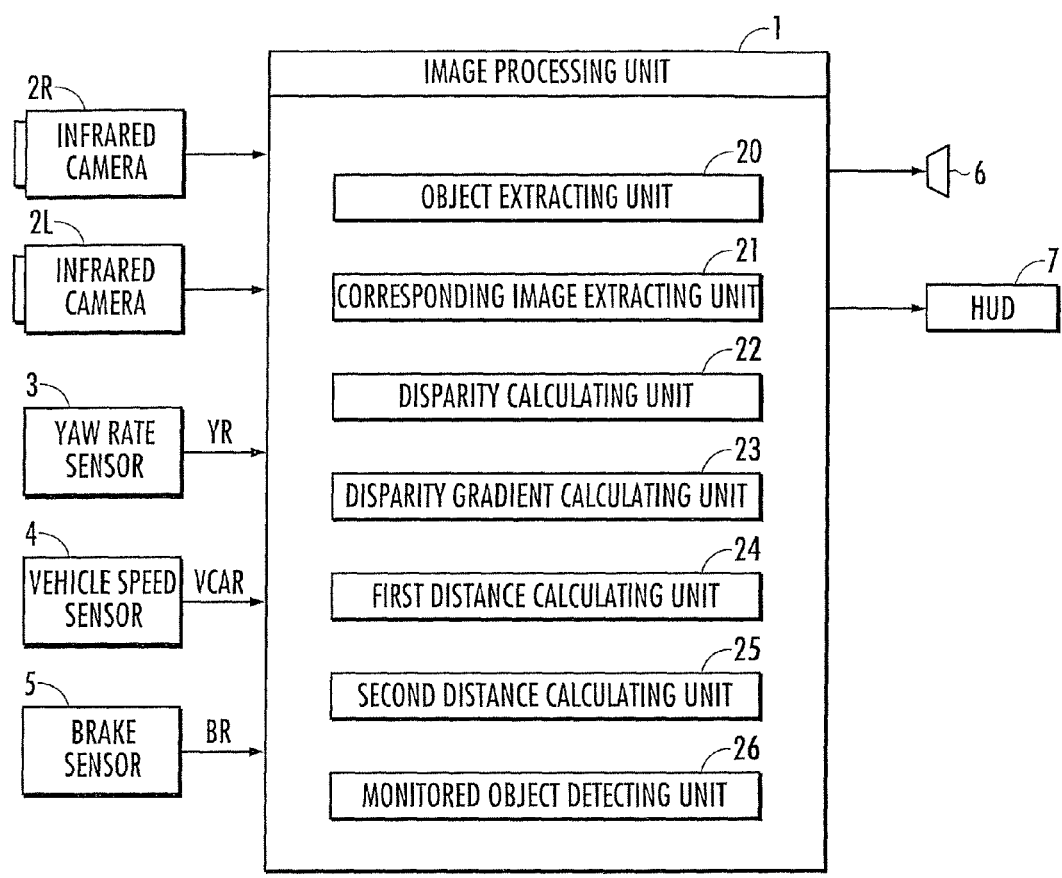
FIG. 1 is a configuration diagram of a vehicle environment monitoring apparatus of the present invention.

An embodiment of the present invention will be now described in further detail with reference to FIG. 1 through FIG. 18. FIG. 1 is a configuration diagram of a vehicle environment monitoring apparatus of the present invention, and the vehicle environment monitoring apparatus is configured from an image processing unit 1.

The image processing unit 1 is connected with: an infrared camera 2R (corresponds to an imaging unit of the present invention) and an infrared camera 2L (corresponds to the imaging unit of the present invention) capable of detecting far-infrared rays; a yaw rate sensor 3 for detecting the yaw rate of the vehicle; a vehicle speed sensor 4 (corresponds to a velocity detecting unit of the present invention) for detecting a traveling speed of the vehicle; a brake sensor 5 for detecting an operation amount of a brake pedal by a driver; a speaker 6 for generating the warning by sound; and a display 7 for displaying the image obtained by the infrared cameras 2R, 2L and also for providing a display to cause the driver to visually recognize an object having high possibility of coming into contact with the vehicle.

Figure 2:
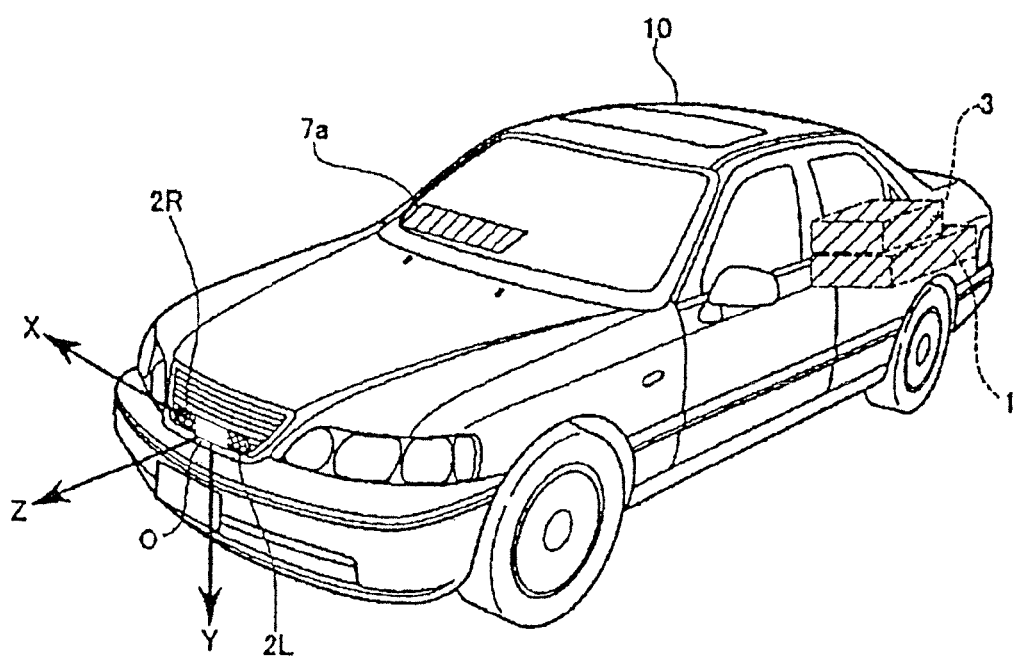
FIG. 2 illustrates how the vehicle environment monitoring apparatus shown in FIG. 1 is attached to a vehicle.

With reference to FIG. 2, the infrared cameras 2R, 2L are arranged at a front portion of a vehicle 10 in an approximately symmetrical position with respect to the center in the vehicle width direction of the vehicle 10. The two infrared cameras 2R, 2L are fixed to the vehicle with the optical axes thereof being parallel to each other, and with the heights thereof from the road surface being equal. Here, the infrared cameras 2R, 2L have a characteristic that the output level becomes higher (i.e., luminance increases) as the temperature of the image becomes higher. Further, the display device 7 is arranged such that a screen 7a thereof is displayed in a windshield of the vehicle 10 at a location in front of the driver.

Further, with reference to FIG. 1, the image processing unit 1 is an electronic unit configured from a microcomputer (not shown) and the like. The image processing unit 1 has a function of converting an analog video signal output from the infrared cameras 2R, 2L to digital data to be taken into an image memory (not shown), and performing various arithmetic processing on the image in front of the vehicle taken into the image memory.

When the microcomputer is caused to execute the vehicle environment monitoring program, the microcomputer functions as: an object extracting unit 20 that extracts a first image area of an object in the real space from a first image taken by the infrared camera 2R; a corresponding image extracting unit 21 that extracts a second image area which has correlation with the first image area from a second image taken by the infrared camera 2L; a disparity calculating unit 22 that calculates a disparity between the first image area extracted by the object extracting unit 20 and the second image area extracted by the corresponding image extracting unit 21; a disparity gradient calculating unit 23 that calculates a disparity gradient (corresponding to the disparity rate of change of the present invention) which is the rate of change of the disparity per unit time from a time series data of the disparity with respect to the identical object calculated by the disparity calculating unit 22; a first distance calculating unit 24 that calculates the distance between the object and the vehicle 10 on the basis of the data on one disparity, a second distance calculating unit 25 that calculates the distance between the object and the vehicle 10 on the basis of the disparity gradient; and a monitored object detecting unit 26 that detects the object having the possibility of coming into contact with the vehicle 10.

Here, the object extracting unit 20 and the corresponding image extracting unit 21 constitute the object extracting unit of the present invention.

Next, with reference to the flow chart shown in FIG. 3, explanation will be given on the monitoring process of the environment of the vehicle 10 by the image processing unit 1.

First in STEP 1, the image processing unit 1 inputs the analog signals of the infrared images output from the infrared cameras 2R, 2L, and in subsequent STEP 2, stores a gray scale image, which is obtained by digitalizing the analog data by A/D conversion, to the image memory.

Here, in STEP 1 through STEP 2, the gray scale image by the infrared camera 2R (hereinafter referred to as a right image) and the gray scale image by the infrared camera 2L (hereinafter referred to as a left image) are obtained. In the right image and the left image, a misalignment (disparity) is generated in the horizontal position of the image area for the same object. Therefore, on the basis of the disparity, it is possible to calculate the distance from the vehicle 10 to the object in real space.

Next in STEP 3, the image processing unit 1 generates a binary image by performing binarization processing (processing for setting the pixel having the luminance of not less than a threshold value to "1" (white), and the pixel having the luminance of less than the threshold value to "0" (black)), while taking the right image as the reference image.

The following STEP 4 through STEP 6 are performed by the processing by the object extracting unit 20. In STEP 4, the object extracting unit 20 turns the image area in each white region contained in the binary image into a run length data (data of a line of white pixels continuing in an x (horizontal) direction of the binary image). Further, in STEP 5, the object extracting unit 20 labels the lines having overlapping portions in a y (vertical) direction of the binary image as one image area, and in STEP 6, extracts the labeled image area as an image candidate of the monitored object.

Next, in STEP 7, the image processing unit 1 calculates a center of gravity G, an area S, and an aspect ratio of a circumscribed quadrangle of each image candidate. Here, the specific calculating method is disclosed in detail in the above-mentioned Japanese patent Laid-Open No. 2001-6096, so that the explanation thereof will be omitted. And, the image processing unit 1 executes in parallel the subsequent STEP 8 through STEP 9 and STEP 20 through STEP 22.

In STEP 8, the image processing unit 1 carries out a sameness determination on the image portion extracted from the binary image on the basis of the image taken by the infrared cameras 2R, 2L for each predetermined sampling period. Thereafter, the image processing unit 1 stores to the memory the time series data of the position (position of the center of gravity) of the image area determined as the image of the same object (time tracking).

Next, in STEP 9, the image processing unit 1 reads a vehicle speed VCAR that is detected by the vehicle speed sensor 4 and a yaw rate YR that is detected by the yaw rate sensor 3, and calculates a rate of turn θr of the vehicle 10 by time integrating the yaw rate YR.

Figure 4:
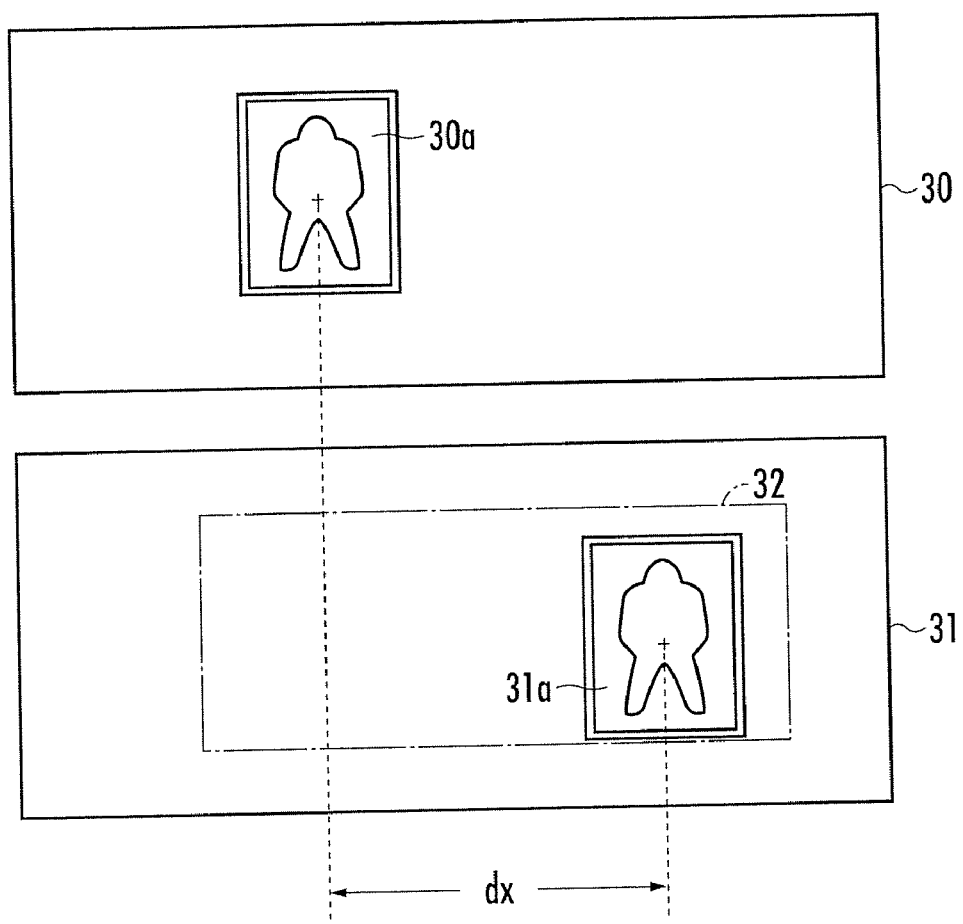
FIG. 4 illustrates the extracting process of an image by a corresponding image extracting unit, and a disparity between images.
Figure 5:
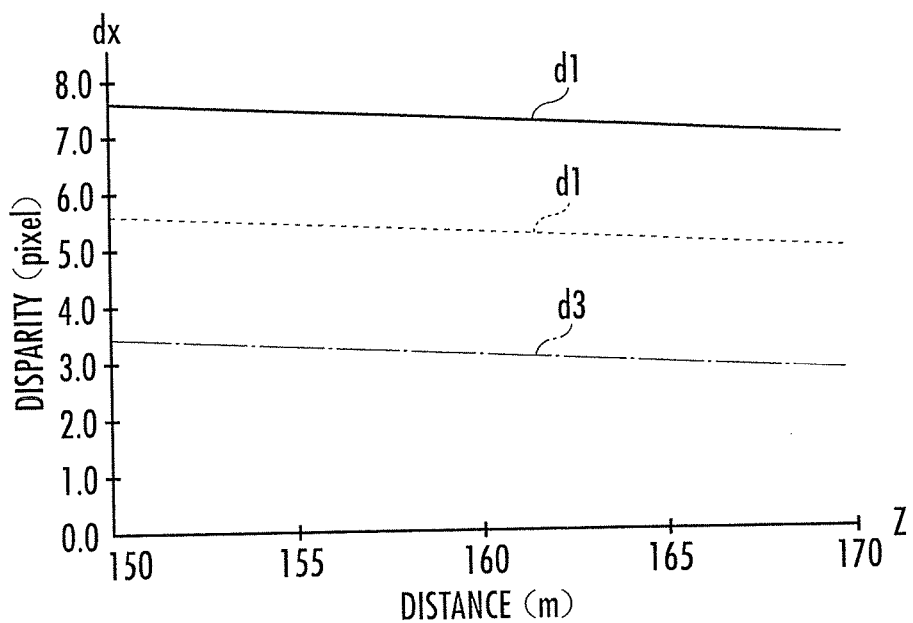
FIG. 5 illustrates the influence of disparity offset, and illustrates the calculation of theoretical disparity on the basis of a disparity gradient.
Figure 5:
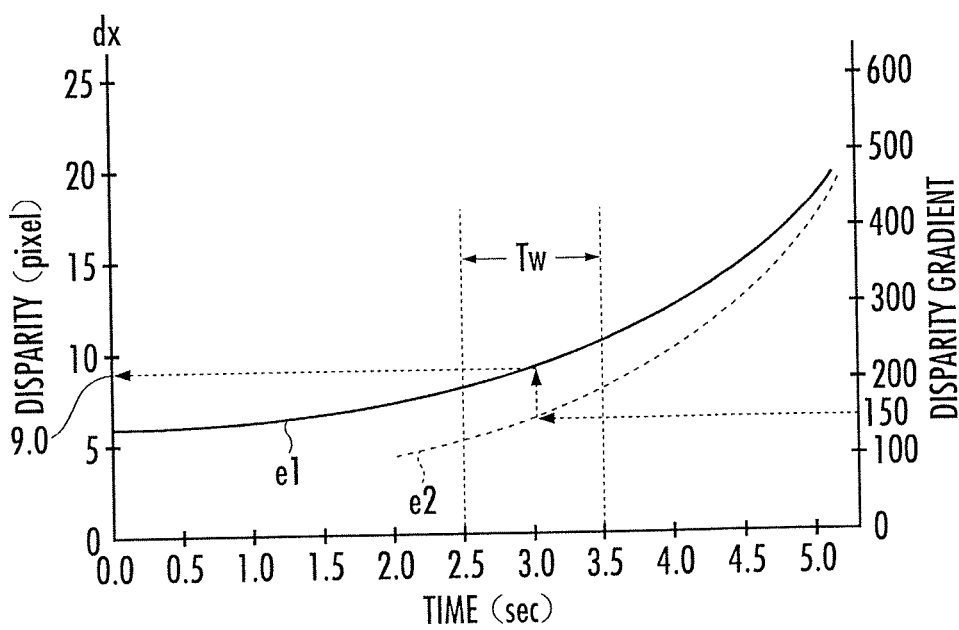

The following STEP 20 through STEP 21 are the processing by the corresponding image extracting unit 21. With reference to FIG. 4, in STEP 20, the corresponding image extracting unit 21 selects one of the image candidates of the monitored object extracted by the object extracting unit 20, and extracts a corresponding searching image 30a (image of the whole region surrounded by the circumscribed quadrangle of the selected candidate image) from a gray scale image 30 of the right image.

In subsequent STEP 21, the corresponding image extracting unit 21 sets a searching region 32 for searching the image corresponding to the searching image 30a from the gray scale image 31 of the left image, and extracts a corresponding image 31a by executing a calculation on correlation with the searching image 30a.

The subsequent STEP 22 is a processing by the disparity calculating unit 22. The disparity calculating unit 22 calculates the difference between the position of the center of gravity of the searching image 30a and the position of the center of gravity of the corresponding image 31a as a disparity dx, and proceeds to STEP 10.

STEP 10 is a processing by the first distance calculating unit 24. The first distance calculating unit 24 calculates a distance Z between the vehicle 10 and the object corresponding to the searching image 30a and the corresponding image 31a in real space with the following expression (1):

$$Z = \frac{f}{p} \cdot \frac{D}{dx} \quad (1)$$

where Z represents the distance between the object and the vehicle 10, f represents a focal length of the infrared cameras 2R, 2L, p represents a pixel pitch of the infrared cameras 2R, 2L, D represents a base length of the infrared cameras 2R, 2L, and dx represents disparity.

Subsequent STEP 11 is a processing by the monitored object detecting unit 26. The monitored object detecting unit 26 executes a "monitored object detecting process" which detects the monitored object having the possibility of coming into contact with the vehicle 10 and which becomes the object of reminder. When the monitored object is detected, the process branches to STEP 30 in subsequent STEP 12, and the image processing unit 1 outputs reminder sound by a buzzer 6 and carries out reminder indication to the display device 7. On the other hand, when the monitored object is not detected, the process returns to STEP 1, and the image processing unit 1 does not carry out the reminder.

Next, an explanation will be given on the calculating process on the distance Z between the object and the vehicle 10 by the second distance calculating unit 25.

As explained above, when the first distance calculating unit 24 calculates the distance Z between the object and the vehicle 10 by the above-mentioned equation (1) using one disparity data, an error occurs between the calculated distance Z and the actual distance between the vehicle and the object (actual distance) from factors such as: (a) influence of vibration during running of the vehicle 10; (b) aiming accuracy when mounting the infrared cameras 2R, 2L to the vehicle 10; and (c) influence from the calculation on correlation when extracting the image area of the same object by the corresponding image extracting unit 21.

For the above-mentioned equation (1), the influence of the error between the actual distance and the calculated distance appears as a disparity offset α, as shown by the following equation (2).

$$Z = \frac{f}{p} \cdot \frac{D}{dx + \alpha} \quad (2)$$

Specifically, when the distance Z between the vehicle 10 and the object becomes longer, the disparity dx calculated by the disparity calculating unit 22 becomes smaller, so that the influence of the disparity offset α in the above-mentioned equation (2) becomes unignorable. Therefore, there arise an inconvenience that the accuracy of the contact determination is deteriorated when determining the possibility of the contact between the object and the vehicle 10 using the distance Z calculated by the first distance calculating unit 24.

Here, FIG. 5(a) shows the relationship between the disparity dx and the distance Z when, for example, the vehicle 10 is traveling at 72 km/h, while taking the disparity dx as the axis of ordinate and taking the distance Z between the vehicle 10 and the object as the axis of abscissas. In the figure, d1 shows the case where the disparity offset α=0, d2 shows the case where the disparity offset α=−2 (pixels), and d3 shows the case where the disparity offset α=−4 (pixels).

As is apparent from FIG. 5(a), the value of the disparity dx corresponding to the distance changes in accordance with the value of the disparity offset α, therefore there arise the calculation error in the distance. For example, when the actual distance between the vehicle 10 and the object is 150 m, the calculated value of the distance becomes 205 m when the disparity offset α=−2 (pixels), and the calculated value of the distance becomes 322 m when the disparity offset α=−4 (pixels).

However, the disparity gradient does not change whether or not the disparity offset is generated. Therefore, the second distance calculating unit 25 calculates the disparity gradient from the time series data of the disparity, and eliminates the influence of the disparity offset α by calculating the distance between the object and the vehicle 10 using the calculated disparity gradient.

Figure 6:
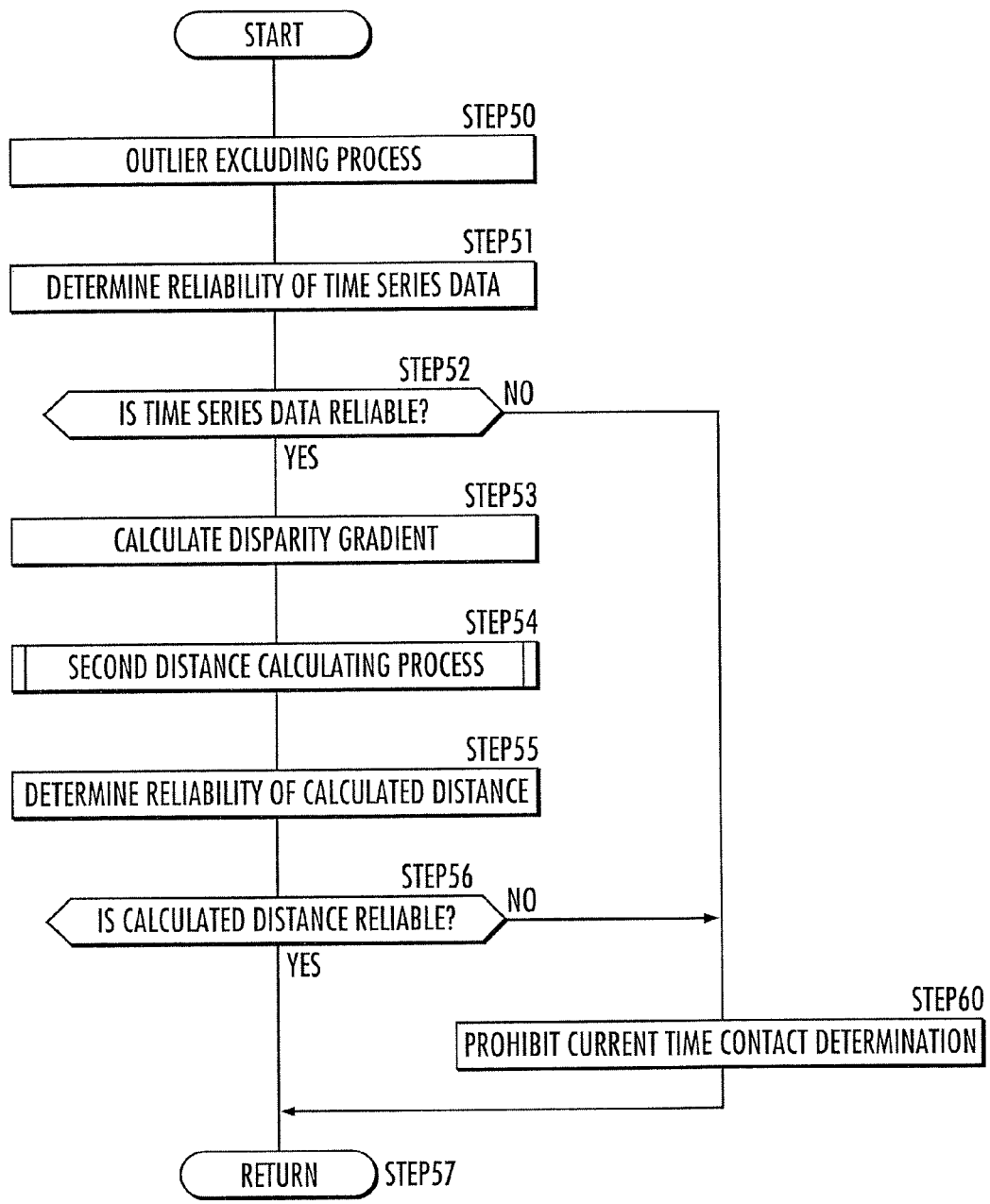
FIG. 6 is a flowchart showing the process of calculating the disparity gradient while determining the reliability of a time series data of the disparity, and determining the reliability of an estimated distance between the object on the basis of the disparity gradient.

The second distance calculating unit 25 calculates the distance between the vehicle 10 and the object using the disparity gradient, following the flow chart shown in FIG. 6. In STEP 50, the second distance calculating unit 25 carries out an outlier excluding process of excluding data when the disparity is not calculated (data when the calculation on correlation by the corresponding image extracting unit 21 failed, and the like), or data with the value of the disparity deviating greatly from other data, from the time series data of the disparity calculated by the disparity calculating unit 22 within a predetermined time Ts (for example, 1 second).

Further, in STEP 51, the second distance calculating unit 25 determines the reliability of the time series data of the disparity, on the basis of the number of the time series data of the disparity, the degree of correlation in the calculation on correlation when obtaining the disparity, and the like. When it is determined that there is reliability in the time series data of the disparity, the process proceeds to STEP 53 from the subsequent STEP 52. On the other hand, when it is determined that there is no reliability in the time series data of the disparity, the process branches to STEP 60 from STEP 52, and the process by the monitored object detecting unit 26 on the basis of the current times series data of the disparity is prohibited.

In STEP 53, the second distance calculating unit 25 calculates the disparity gradient from the time series data of the disparity, and in STEP 54, the distance Z between the vehicle 10 and the object is calculated on the basis of the disparity gradient (a second distance calculating process). The details of the second distance calculating process in STEP 54 will be explained later.

In subsequent STEP 55, the second distance calculating unit 25 compares the distance Z2 between the vehicle 10 and the object calculated using the disparity gradient, and the distance Z1 between the vehicle 10 and the object calculated by the first distance calculating unit 24 according to the above-mentioned equation (1) using, for example, an intermediate value of the time series data of the disparity.

Thereafter, when the difference between Z1 and Z2 deviates from a predetermined range (a range inherent to the vehicle 10 which varies with the attaching accuracy of the infrared cameras 2R, 2L, the vibration of the vehicle 10, and the like), the second distance calculating unit 25 determines that the disparity offset α is large, and the reliability of Z2 is low.

When it is determined by the second distance calculating unit 25 that the reliability of Z2 is low, the process branches to STEP 60 from the subsequent STEP 56, and the monitored object detecting process by the monitored object detecting unit 26 for current time is prohibited. On the other hand, when it is determined that the reliability of Z1 is not low, the process proceeds to STEP 57 from STEP 56, and at this time the monitored object detecting process by the monitored object detecting unit 26 is carried out.

Figure 7:
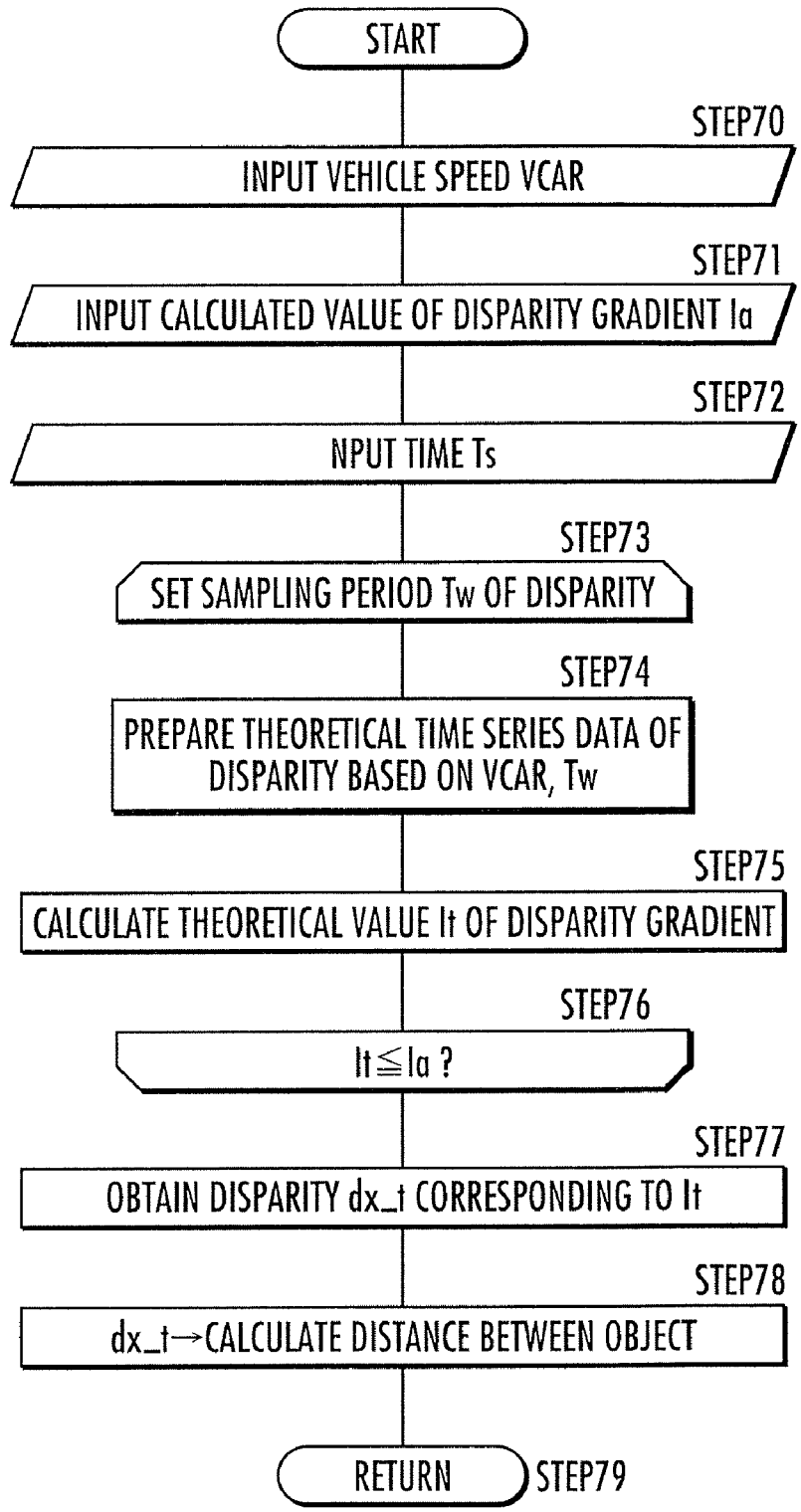
FIG. 7 is a flow chart showing the process of obtaining the distance between the object on the basis of the disparity gradient.

Next, with reference to FIG. 7, explanation will be given on the "second distance calculating process" in STEP 54 of FIG. 6. In STEP 70, the second distance calculating unit 25 inputs a vehicle speed VCAR of the vehicle 10 calculated by the vehicle speed sensor 4. Then, in subsequent STEP 71, the second distance calculating unit 25 inputs a calculated value Ia of the disparity gradient calculated in STEP 53 of FIG. 6, and inputs the time (a sampling time of the time series data of the disparity) Ts (for example, 1 second) in STEP 72.

Thereafter, the second distance calculating unit 25 repeatedly executes the loop from STEP 73 through STEP 76, and calculates the disparity corresponding to the calculated value Ia of the disparity gradient. FIG. 5(b) shows the change in the disparity and the disparity gradient with respect to the static object in the case where the disparity offset α=0 and the vehicle 10 is traveling at 100 km/h, while taking the disparity as the left axis of ordinate, the disparity gradient as the right axis of ordinate, and time as the axis of abscissa. In the figure, e1 represents the time series data of the disparity (time series data of the theoretical disparity), and e2 represents the disparity gradient (theoretical disparity gradient).

In the loop from STEP 73 through STEP 76, the second distance calculating unit 25 sets a sampling period Tw of the disparity so that it is continuously set from lapse of five seconds in FIG. 5(b) and shift by the sampling time Ts (for example, one second) towards zero second (for example, 4 to 5 seconds, 3.5 to 4.5 seconds, 3.0 to 4.0 seconds, 2.5 to 3.5 seconds, . . . ) in STEP 73, and the theoretical time series data of the disparity at Tw is prepared on the basis of the velocity VCAR of the vehicle 10 and the sampling period Tw in STEP 74.

In subsequent STEP 75, the second distance calculating unit 25 calculates a theoretical value It of the disparity gradient from the theoretical time series data of the disparity at each sampling period Tw, and in STEP 76 determines whether or not the calculated value Ia of the disparity gradient is equal to or more than the theoretical value It.

When the calculated value Ia of the disparity gradient is equal to or more than the theoretical value It in STEP 76, then the process leaves the loop and proceeds to STEP 77, and when the calculated value Ia of the disparity gradient is smaller than the theoretical value It, then the process returns to STEP 73 and carries out the processing from STEP 74 after setting the next sampling period Tw.

In STEP 77, the second distance calculating unit 25 obtains a disparity dx_t corresponding to the theoretical value It of the disparity gradient finally calculated at the loop from STEP 73 through STEP 76. For example, when the calculated value Ia of the disparity gradient is 150, the disparity 9.0 of the theoretical time series data at the intermediate value, i.e., 3.0 seconds of the sampling period Tw (2.5 to 3.5 seconds), in which the calculated value Ia of the disparity gradient became equal to or more than the theoretical value It, is obtained as shown in FIG. 5(b).

In subsequent STEP 78, the second distance calculating unit 25 substitutes the disparity 9.0 to the above-mentioned equation (1), and calculates the distance (corrected distance) between the vehicle and the object.

Next, with reference to FIG. 8 and FIG. 9, explanation will be given on other embodiments for calculating the distance between the vehicle and the object from the disparity gradient.

First, FIG. 8(a) and FIG. 8(b) shows the distribution of the time series data of the disparity while taking the disparity as the axis of ordinate and time as the axis of abscissa. In FIG. 8(a), a line Sa is obtained from the calculated data of nine disparities during sampling period from t11 through t13.

Further, FIG. 8(b) shows a line including the theoretical disparity gradient when the disparity offset α=0, for each of the distance between the vehicle and the object. S1 is a line in which the distance is set at 190 m, S2 is a line in which the distance is set at 180 m, and Sn is a line in which the distance is set at 100 m.

Thereafter, the second distance calculating unit 25 selects the line including the same gradient as the gradient of the line Sa obtained from the time series data of the disparity, as shown in FIG. 8(a), from the lines S1 through Sn in FIG. 8(b), and is capable of obtaining the set distance of the selected line as the distance between the vehicle 10 and the object.

Figure 9:
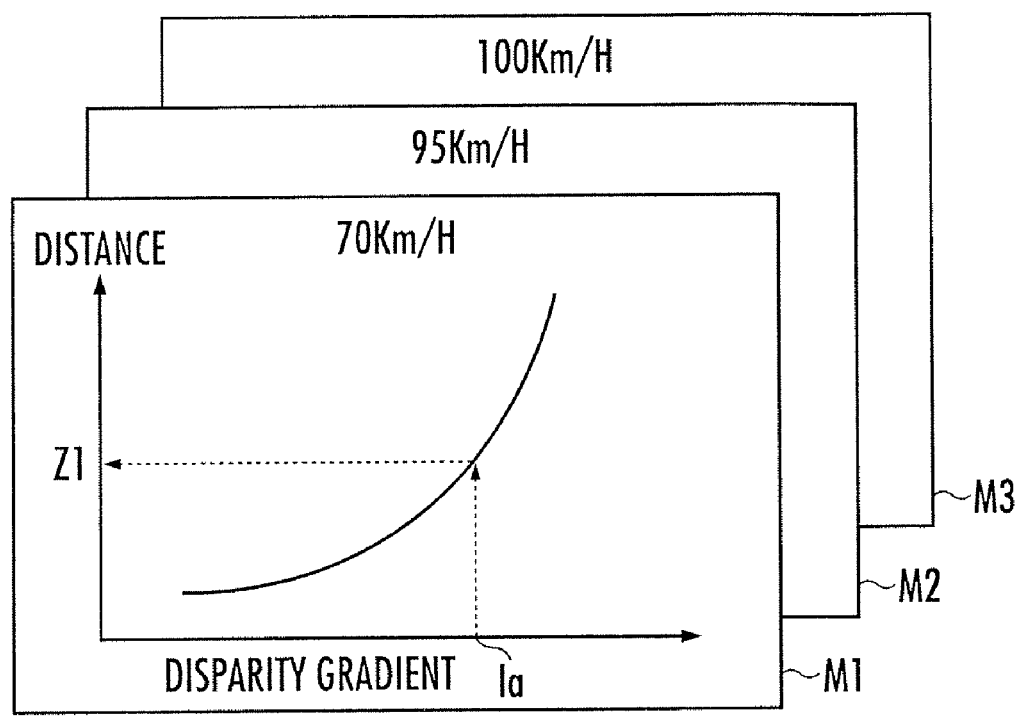
FIG. 9 illustrates the process of obtaining the distance between the object on the basis of the disparity gradient.

Next, is it shown in FIG. 9 that correlation maps M1, M2, M3, . . . between the disparity gradient and the distance to the object, for each traveling speed of the vehicle 10 (in FIG. 9, for 70 km/h, 95 km/h, and 100 km/h) is prepared in advance. By applying the disparity gradient calculated from the time series data of the disparity to the correlation map selected in accordance with the traveling speed of the vehicle 10, the second distance calculating unit 25 is capable of obtaining the distance Z between the vehicle 10 and the object.

Figure 8:
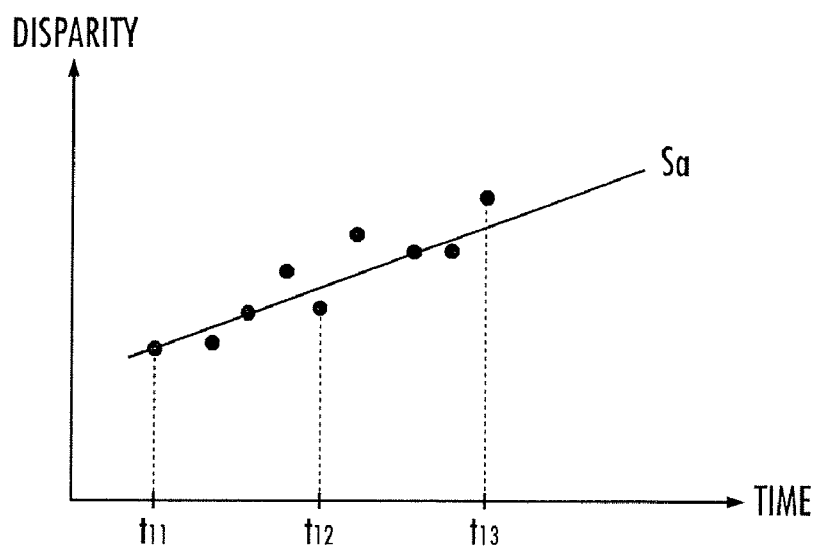
FIG. 8 illustrates the process of obtaining the distance between the object on the basis of the disparity gradient.
Figure 8:
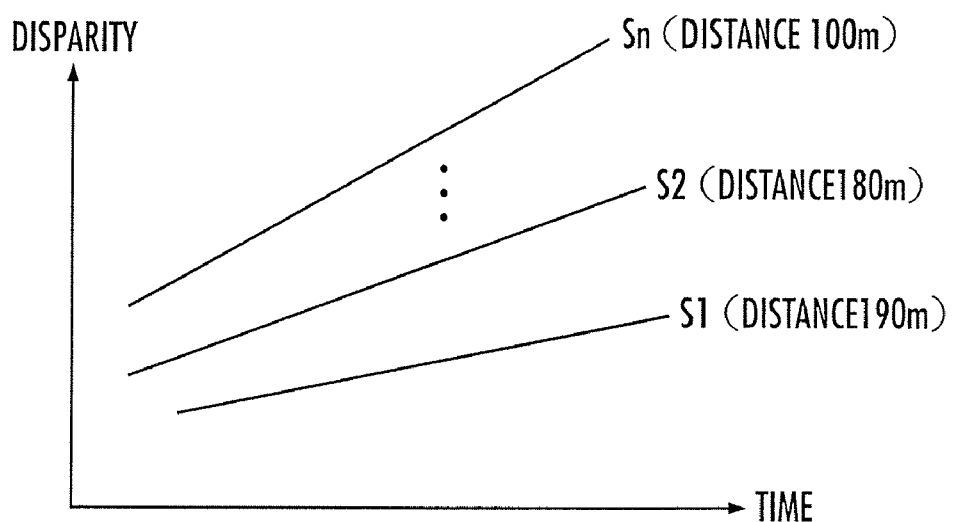

For example, when the traveling speed of the vehicle 10 is 70 km/h, and the disparity gradient calculated from the time series data of the disparity is Ia, the first distance calculating unit 24 is capable of obtaining the distance Z between the vehicle 10 and the object by selecting the correlation map M1 in FIG. 8, and applying the disparity gradient Ia thereto.

Next, explanation will be given on a first embodiment through fourth embodiment of the "monitored object detecting process" in STEP 11 of FIG. 3.

[First Embodiment]

Figure 10:
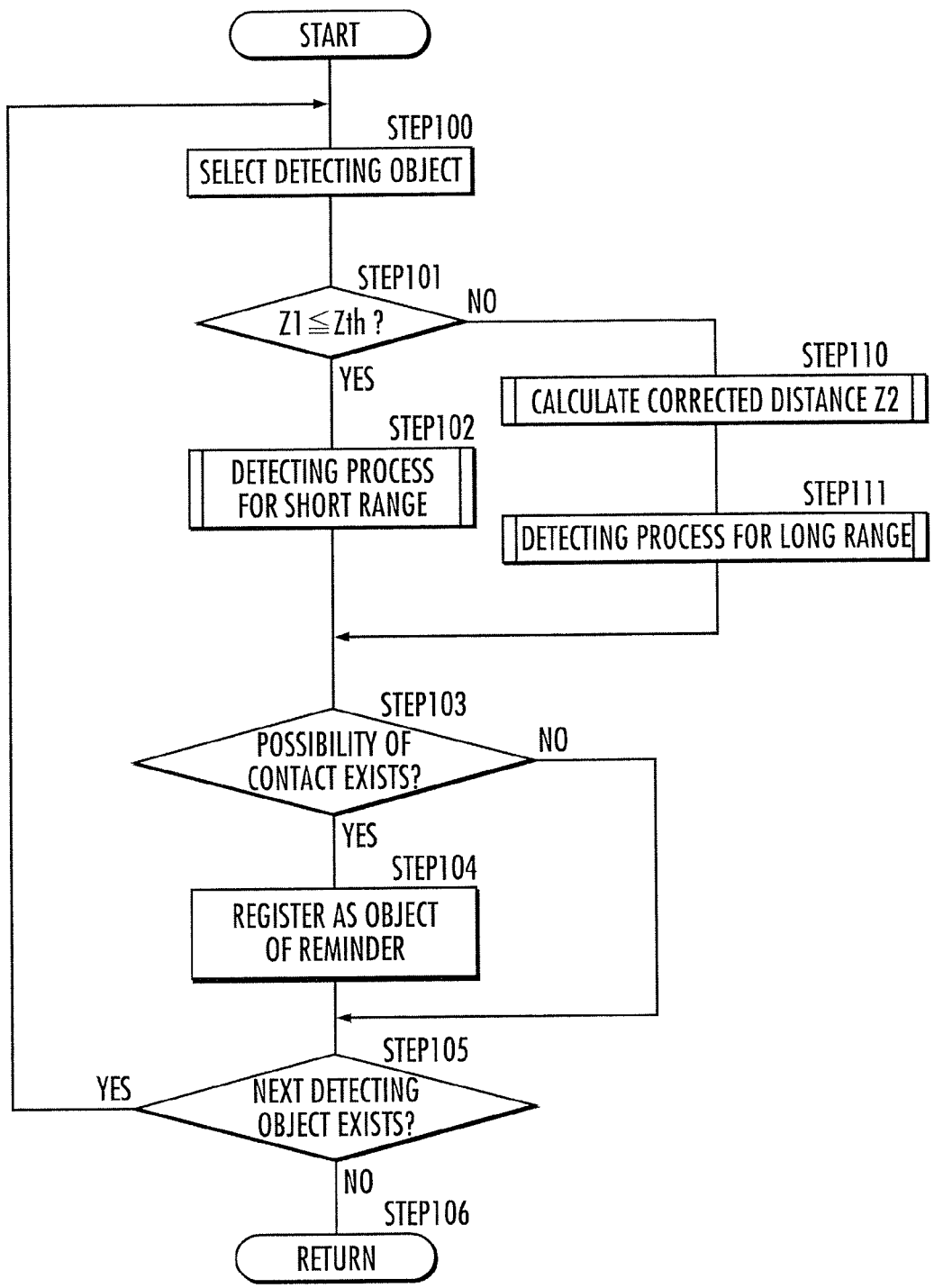
FIG. 10 is a flow chart of the first embodiment of the monitored object detecting process.
Figure 11:
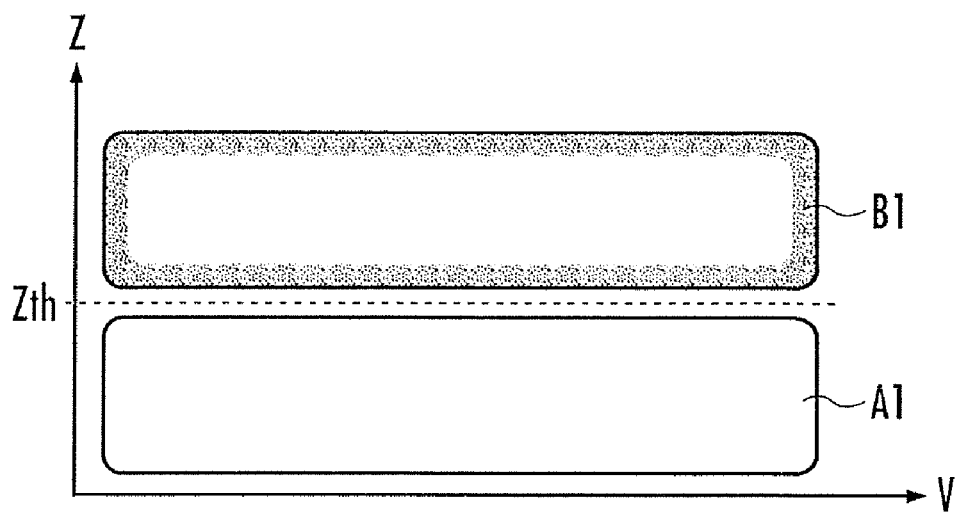
FIG. 11 illustrates an executing range of a detecting process for short range and a detecting process for long range in the first embodiment of the monitored object detecting process.
Figure 11:
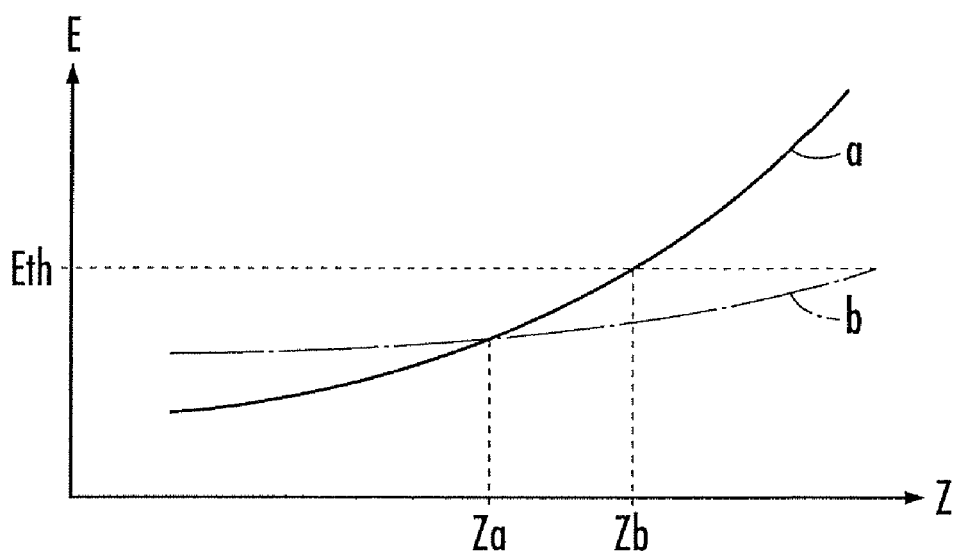

First, the first embodiment of "the monitored object detecting process" will be explained according to the flow chart shown in FIG. 10. In STEP 100, the monitored object detecting unit 26 selects any of the image area extracted by the object extracting unit 20 as the detecting object.

In subsequent STEP 101, the monitored object detecting unit 26 determines, for the selected image area, whether or not the distance Z1 between the object and the vehicle 10 calculated by the first distance calculating unit 24 is equal to or less than a Zth (corresponds to the predetermined distance of the present invention).

In FIG. 11(b), a transition of the error of the distance Z1 between the object and the vehicle 10 calculated by the first distance calculating unit 24 using one disparity data to the true distance is indicated by "a", and a transition of the error of the distance Z2 between the object and the vehicle 10 calculated by the second distance calculating unit 25 using the disparity gradient is indicated by "b". In FIG. 11(b), the error E is set as the axis of ordinate and the distance Z is set as the axis of abscissa.

With reference to FIG. 11(b), Zth in STEP 101 is, for example, is set to Zb in which the error of the distance Z1 calculated by the first distance calculating unit 24 exceeds an upper limit Eth of the allowable range of the error, and to Za in which the error of the distance Z1 calculated by the first distance calculating unit 24 is larger than the error of the distance Z2 calculated by the second distance calculating unit 25.

Figure 12:
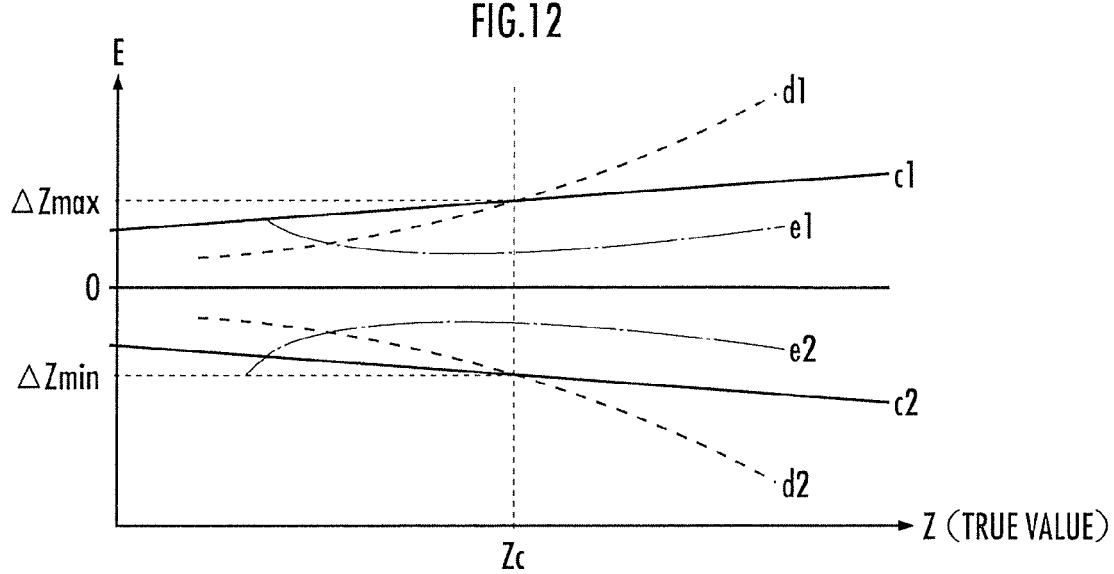
FIG. 12 illustrates a method of setting a predetermined distance, in a case where a necessary distance accuracy for calculating the distance between the object and the vehicle to become lower as the distance between the object and the vehicle becomes longer.

Further, FIG. 12 explains the setting method of the predetermined distance Zth, when setting a necessary distance accuracy when calculating the distance between the object and the vehicle 10 to become smaller as the distance between the object and the vehicle 10 becomes longer. In FIG. 12, the error E is set as the axis of ordinate, and the distance Z is set as the axis of abscissa.

In FIG. 12, reference c1 to c2 is the necessary distance accuracy (range of allowable error), reference d1 to d2 is the error range of the distance Z1 calculated by the first distance calculating unit 24, and reference e1 to e2 is the error range of the distance Z2 calculated by the second distance calculating unit 25. In this case, the error Zc of the distance Z1 calculated by the first distance calculating unit 24 which exceeds the range c1 to c2 is set as the predetermined distance Zth.

In STEP 101, when the distance Z1 calculated by the first distance calculating unit 24 is equal to or less than the predetermined distance Zth, the process proceeds to STEP 102. Then, the monitored object detecting unit 26 carries out a "detecting process for short range".

The "detecting process for short range" applies an object detecting algorithm for short range intended mainly for pedestrians and bicycles existing in the vicinity of the vehicle 10, and determines whether or not the object is a pedestrian or a bicycle.

When it is determined that the object is a pedestrian or a bicycle, the monitored object detecting unit 26 determines the possibility of the object coming into contact with the vehicle 10 within a predetermined margin time, determines whether or not the object exists within an approach determination region set to the surroundings of the vehicle, and determines the possibility of the object entering the approach determination region from outside the approach determination region and coming into contact with the vehicle 10, or the like. Thereafter, the process proceeds to STEP 103.

The determining process of the possibility of contact with the vehicle as mentioned above is explained in great detail as "the warning determining process" in the above-mentioned Japanese Patent Laid-Open No. 2001-6069, so that the explanation thereof will be omitted.

When the distance Z1 calculated by the first distance calculating unit 24 is longer than the predetermined distance Zth in STEP 101, then the process branches to STEP 110. Thereafter, the monitored object detecting unit 26 calculates the distance Z2 (corrected distance) between the object and the vehicle 10 by the second distance calculating unit 25 using the disparity gradient. Further, in subsequent STEP 111, the monitored object detecting unit 26 carries out a "detecting process for long range".

The "detecting process for long range" applies an object detecting algorithm for long range intended mainly for a large animal existing within a range somewhat away from the vehicle 10, and determines whether or not the object is a large animal.

When it is determined that the object is a large animal, the monitored object detecting unit 26 determines the possibility of the object coming into contact with the vehicle 10 within a predetermined margin time, and determines the possibility of the object entering the approach determination region from outside the approach determination region and coming into contact with the vehicle 10, or the like. Thereafter, the process proceeds to STEP 103.

When it is determined by either the "detecting process for short range" of the "detecting process for long range" that there is a possibility of contact between the object and the vehicle 10, the process proceeds from STEP 103 to STEP 104, and the monitored object detecting unit 26 registers the object as the object of reminder. On the other hand, when it is determined by the "detecting process for short range" that there is no possibility of contact between the object and the vehicle 10, the process branches from STEP 103 to STEP 105.

Figure 3:
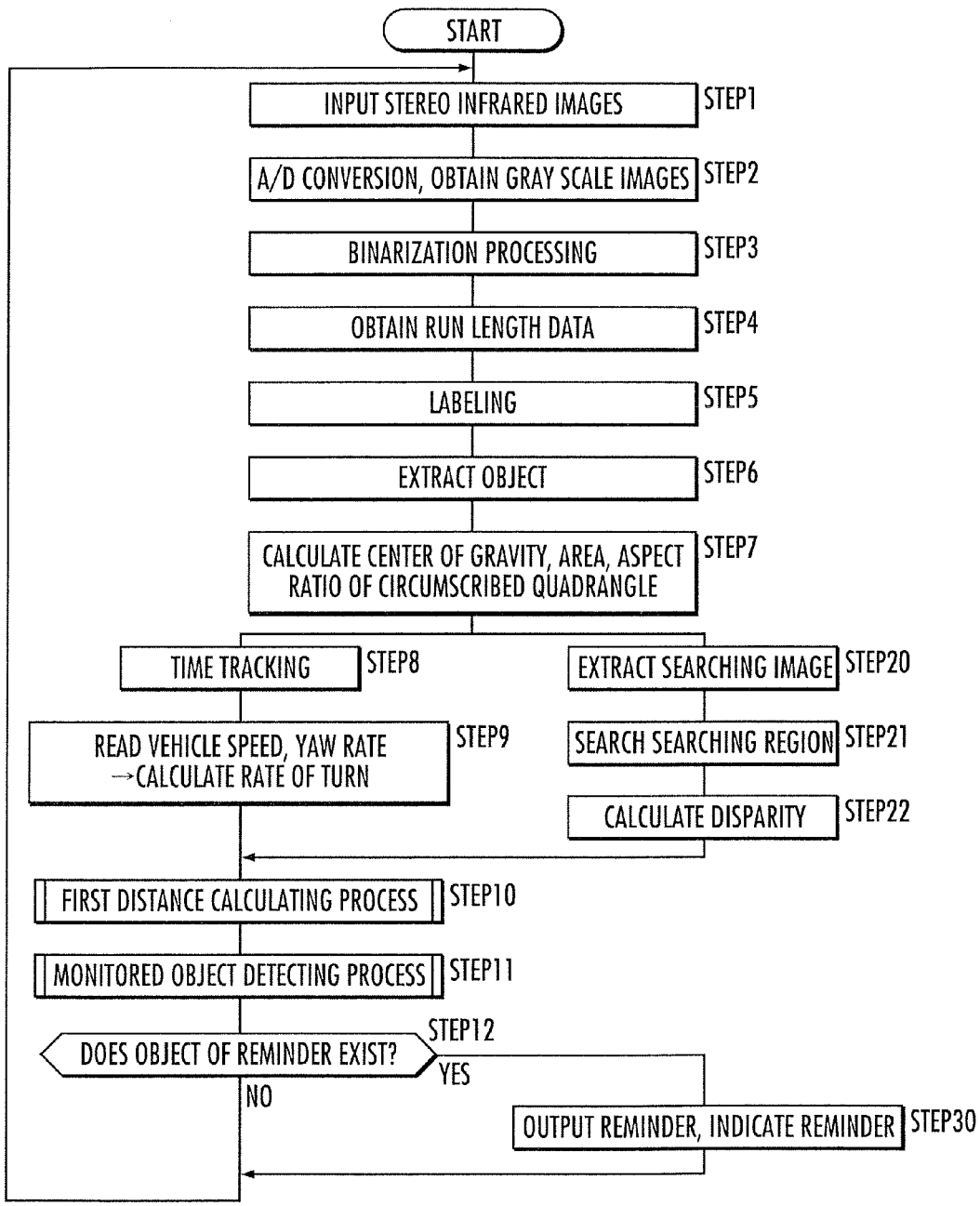
FIG. 3 is a flow chart illustrating a series of processing by an image processing unit shown in FIG. 1.

In STEP 105, the monitored object detecting unit 26 determines the existence or nonexistence of the next detecting object (the image area extracted at STEP 6 in FIG. 3 not yet undergoing the processes of STEP 100 through STEP 104, and STEP 110 through STEP 111).

If there exists the next detecting object, the process returns to STEP 100, and executes the processing from STEP 100 on to the next object. On the other hand, when there is no next detection target, then the process proceeds to STEP 106 and terminates the "monitored object detecting process".

FIG. 11(a) shows the range in which the "detecting process for short range" and the "detecting process for long range" is executed in the first embodiment of the "monitored object detecting process", and the distance (Z) between the object and the vehicle 10 is set as the axis of ordinate and the traveling speed (V) of the vehicle 10 is set as the axis of abscissa.

In FIG. 11(a), the "detecting process for short range" is executed in a range A1 in which the distance between the object and the vehicle 10 is equal to or less than Zth, and the "detecting process for long range" is executed in a range B2 in which the distance between the object and the vehicle 10 is longer than Zth.

[Second Embodiment]

Figure 13:
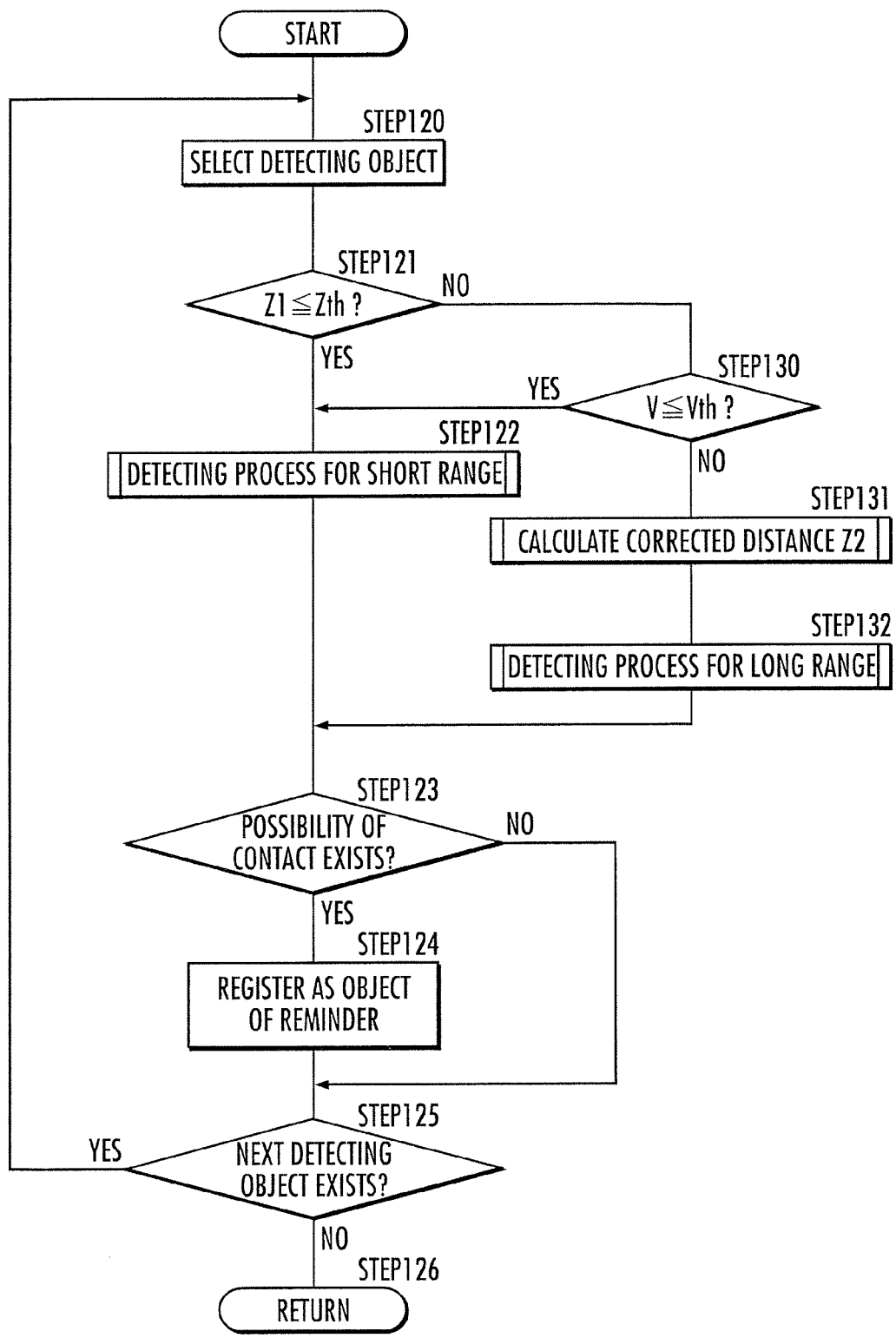
FIG. 13 is a flow chart of a second embodiment of the monitored object detecting process.

Next, an explanation will be given on the second embodiment of the "monitored object detecting process", according to the flow chart shown in FIG. 13. The flow chart in FIG. 13 is the flow chart shown in FIG. 10 added with a determining unit in STEP 130, and the process in STEP 120 through STEP 126 corresponds to the process of STEP 100 through STEP 106 in FIG. 10, and the process in STEP 131 through STEP 132 corresponds to the process of STEP 110 through STEP 111 in FIG. 10. Therefore, the explanations thereof will be omitted.

In the flow chart of FIG. 13, when the distance Z1 between the object and the vehicle 10 calculated by the first distance calculating unit 24 in STEP 121 is longer than Zth, the process branches to STEP 130, and the monitored object detecting unit 26 determines whether or not the traveling velocity V of the vehicle 10 detected by the vehicle speed sensor 4 is equal to or less than a determination threshold value of the vehicle speed Vth (corresponds to the predetermined speed of the present invention).

The determination threshold value of the vehicle speed Vth is decided from Zth and an upper limit time Tth for the detecting timing of the object. For example, when Zth=80 (m), and Tth 4 (sec), then Vth=72 (km/h). Alternatively, when the "detecting process for long range" is applied only in expressways, then it may be set so that Vth=80 (km/h).

In STEP 130, when the traveling velocity V of the vehicle 10 is equal to or less than Vth, the process branches to STEP 122, and the monitored object detecting unit 26 executes the "detecting process for short range". On the other hand, when the traveling velocity V of the vehicle 10 exceeds Vth, the process proceeds to STEP 131, and the monitored object detecting unit 26 executes the "detecting process for long range".

Figure 14:
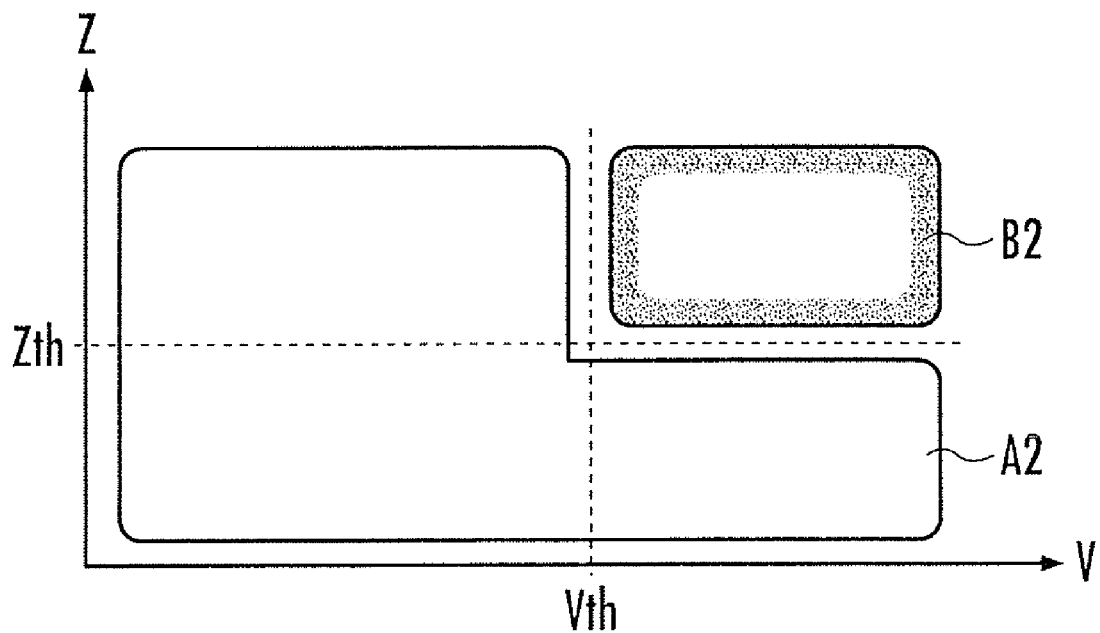
FIG. 14 illustrates an executing range of the detecting process for short range and the detecting process for long range in the second embodiment of the monitored object detecting process.

FIG. 14 shows the range in which the "detecting process for short range" and the "detecting process for long range" is executed in the second embodiment of the "monitored object detecting process", and the distance (z) between the object and the vehicle 10 is set as the axis of ordinate and the traveling speed (V) of the vehicle 10 is set as the axis of abscissa.

In FIG. 14, the "detecting process for short range" is executed in a range A2 in which the distance between the object and the vehicle 10 is equal to or less than Zth, and in which the distance between the object and the vehicle 10 is longer than Zth and also the velocity V of the vehicle 10 is equal to or less than Vth. Further, the "detecting process for long range" is executed in a range B2 in which the distance Z between the object and the vehicle 10 is longer than Zth and also the velocity V of the vehicle 10 exceeds Vth.

[Third Embodiment]

Next, an explanation will be given on the third embodiment of the "monitored object detecting process", according to the flow chart shown in FIG. 15. In STEP 140, the monitored object detecting unit 26 selects any of the image area extracted by the object extracting unit 20 as the detecting object.

In subsequent STEP 141, the monitored object detecting unit 26 determines whether or not the distance Z1 between the object and the vehicle 10 calculated by the first distance calculating unit 24 is within a preset range (Zmin through Zmax) taking Zth as the center, for the selected image area.

When the distance Z1 calculated by the first distance calculating unit 24 is within the range Zmin through Zmax, then the process proceeds to STEP 142, and the monitored object detecting unit 26 executes the "detecting process for short range". When it is determined that there is a possibility of contact between the object and the vehicle 10, then the process proceeds from subsequent STEP 143 to STEP 144.

On the other hand, when it is determined that there is no possibility of contact between the object and the vehicle 10, then the process branches from STEP 143 to STEP 170. Then, the monitored object detecting unit 26 calculates the distance Z2 between the object and the vehicle 10 by the second distance calculating unit 25 using the disparity gradient, and executes the "detecting process for long range" in subsequent STEP 171.

As seen from above, in the case where the distance calculated by the first distance calculating unit 24 is within the range of Zmin through Zmax, the "detecting process for long range" is executed when it is determined that there is no possibility of contact between the object and the vehicle 10 by "the detecting process for short range". By doing so, it is possible to restrain the occurrence of detection error of the pedestrian or the large animal and the like, in the vicinity of the boundary of deciding whether the distance is short or long.

In subsequent STEP 172, the monitored object detecting unit 26 determines the existence or nonexistence of the possibility of contact between the object and the vehicle 10. When the possibility of contact between the object and the vehicle 10 exists, then the process branches to STEP 144. When the possibility of contact between the object and the vehicle 10 does not exist, the process proceeds to STEP 145.

Further, in STEP 141, when the distance Z1 calculated by the first distance calculating unit 24 is not within the range of Zmin through Zmax, the process branches to STEP 150. Then, the monitored object detecting unit 26 determines whether or not the distance Z1 calculated by the first distance calculating unit 24 is equal to or less than Zmin.

When the distance Z1 calculated by the first distance calculating unit 24 is equal to or less than Zmin, the process branches to STEP 152 and the monitored object detecting unit 26 executes the "detecting process for short range". Then, the process proceeds to STEP 153 and the monitored object detecting unit 26 determines the possibility of contact between the object and the vehicle 10.

On the other hand, when the distance Z1 calculated by the first distance calculating unit 24 is longer than Zmin in STEP 150, the process proceeds to STEP 151, and the monitored object detecting unit 26 determines whether the velocity V of the vehicle 10 is equal to or less than Vth. When the velocity V of the vehicle 10 is equal to or less than Vth, the process proceeds to STEP 152. When the velocity V of the vehicle 10 exceeds Vth, then the process branches to STEP 160.

The monitored object detecting unit 26 calculates the distance Z2 between the object and the vehicle by the second distance calculating unit 25 in STEP 160, executes the "detecting process for long range" in subsequent STEP 161, and then the process proceeds to STEP 153.

When it is determined that there is a possibility of contact between the object and the vehicle 10 by the "detecting process for short range" in STEP 152 or the "detecting process for long range" in STEP 161, the process branches to STEP 144, and when it is determined that there is no possibility, the process proceeds to STEP 145. The process in STEP 144 through STEP 146 corresponds to the process in STEP 104 through STEP 106 in FIG. 10, so the explanation thereof will be omitted.

Figure 16:
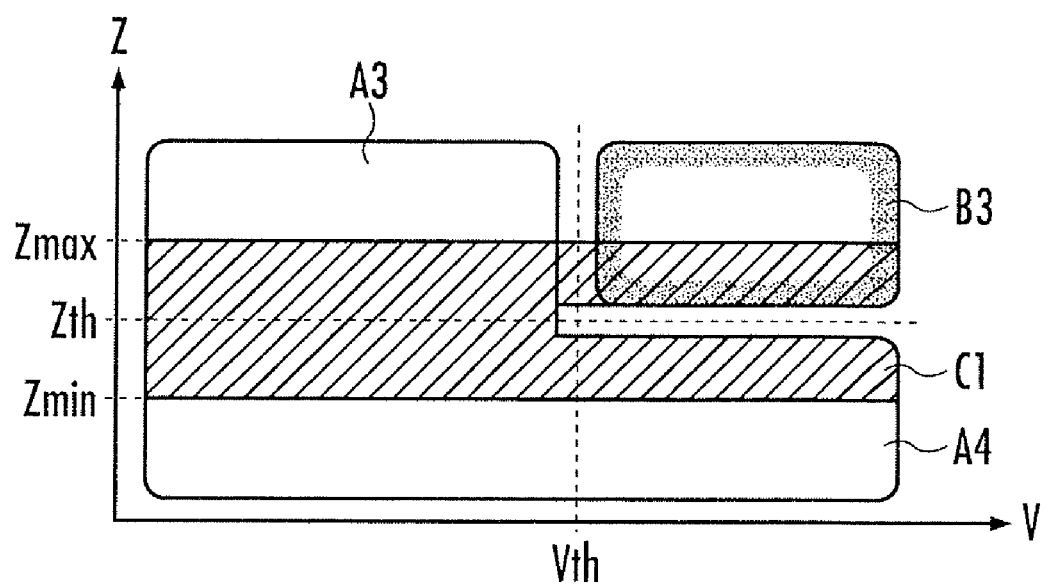
FIG. 16 illustrates an executing range of the detecting process for short range and the detecting process for long range in the third embodiment of the monitored object detecting process.

FIG. 16 shows the range in which the "detecting process for short range" and the "detecting process for long range" is executed in the third embodiment of the "monitored object detecting process" explained above, and the distance (Z) between the object and the vehicle 10 is set as the axis of ordinate and the traveling speed (V) of the vehicle 10 is set as the axis of abscissa.

In FIG. 16, the "detecting process for short range" is executed when the distance Z between the object and the vehicle 10 is within a range C of Zmin through Zmax and taking Zth as the center. At the same time, when it is determined that there is no possibility of contact between the object and the vehicle by the "detecting process for short range", then the "detecting process for long range" is also executed.

Further, in a range A3 in which the velocity V of the vehicle 10 is equal to or less than Vth and also the distance between the object and the vehicle 10 is longer than Zmax, and in a range A4 in which the distance Z between the object and the vehicle 10 is equal to or less than Zmin, only the "detecting process for short range" is executed. Still further, in a range B3 in which the velocity V of the vehicle 10 exceeds Vth and also the distance Z between the object and the vehicle 10 is longer than Zmax, only the "detecting process for long range" is executed.

[Fourth Embodiment]

Next, an explanation will be given on the fourth embodiment of the "monitored object detecting process" according to the flow chart shown in FIG. 17. The flow chart in FIG. 17 is the flowchart in FIG. 15 with the conditions for the determining unit in STEP 141 changed to make it STEP 181, and the conditions for the determining unit in STEP 150 changed to make it STEP 190.

Figure 15:
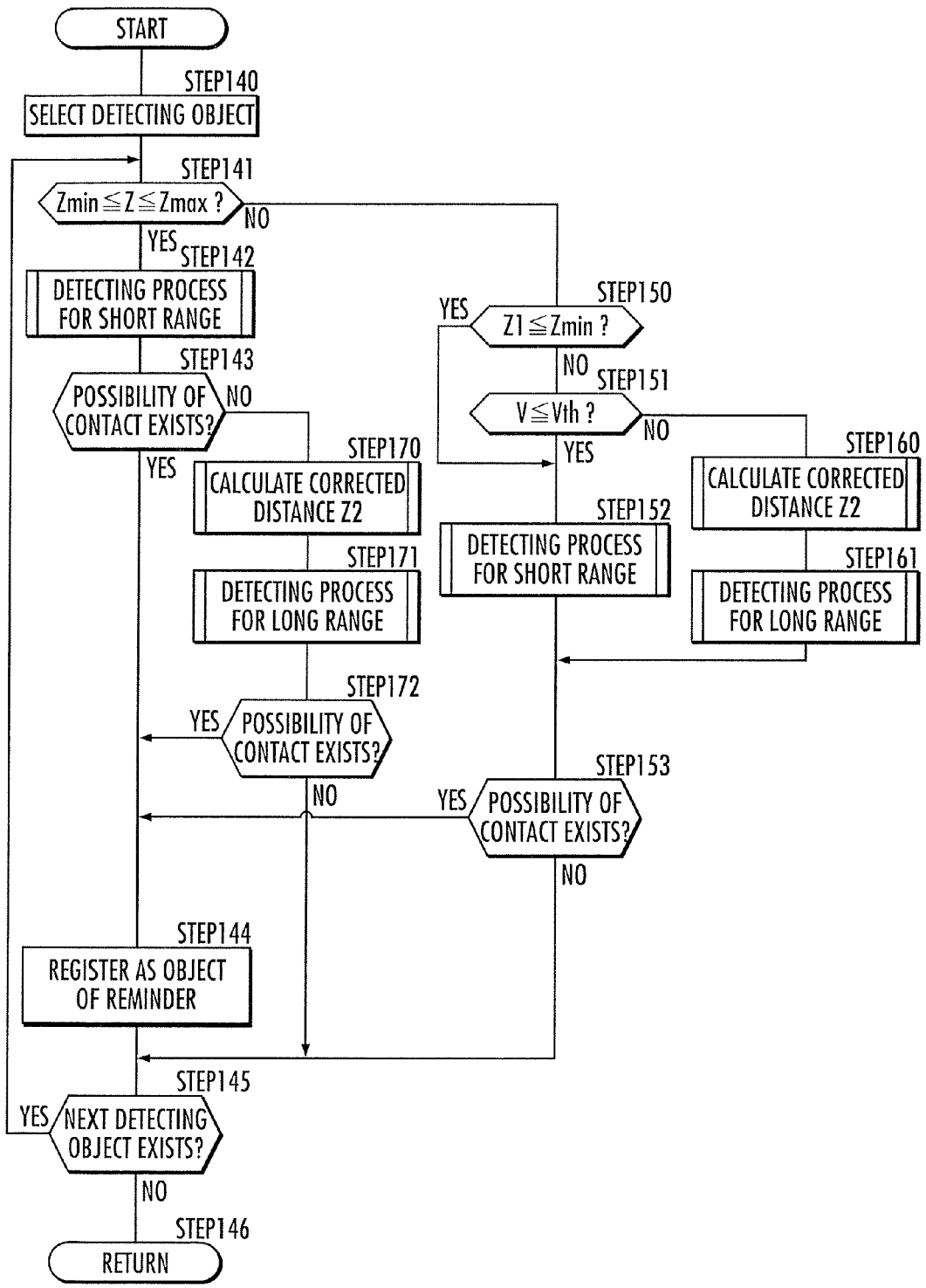
FIG. 15 is a flow chart of a third embodiment of the monitored object detecting process.
Figure 17:
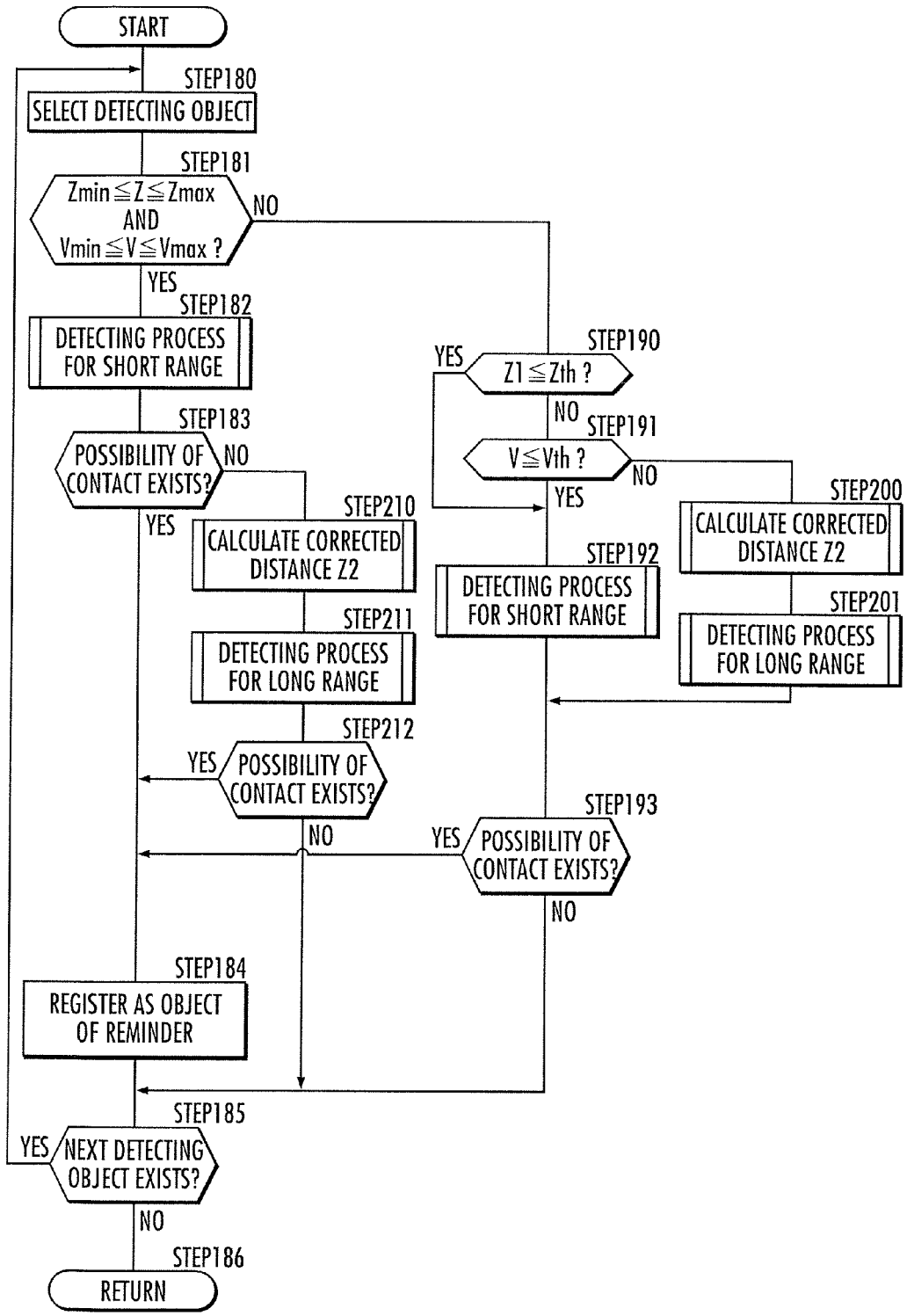
FIG. 17 is a flow chart of a fourth embodiment of the monitored object detecting process.

The process of STEP 183 through STEP 186 in FIG. 17 corresponds to STEP 142 through STEP 146 in FIG. 15, the process of STEP 210 through 212 corresponds to STEP 170 through STEP 172 in FIG. 15, the process of STEP 191 through STEP 193 corresponds to STEP 151 through 153 in FIG. 15, and the process of STEP 200 through STEP 201 corresponds to STEP 160 through STEP 161 in FIG. 15. Therefore, explanation on these processes will be omitted.

In the flow chart of FIG. 17, it is determined whether or not the distance Z1 calculated by the first distance calculating unit 24 is within a predetermined range (Zmin through Zmax) taking Zth as the center, and the velocity V of the vehicle 10 is within a predetermined range (Vmin through Vmax) taking Vth as the center, in STEP 181.

Thereafter, when the condition in STEP 181 is fulfilled, the process proceeds to STEP 182, and when the condition in STEP 181 is not fulfilled, then the process branches to STEP 190. In STEP 190, the monitored object detecting unit 26 determines whether or not the distance Z1 calculated by the first distance calculating unit 24 is equal to or less than Zth. When it is determined that Z1 is equal to or less than Zth, the process proceeds to STEP 192, and when it is determined that Z1 is longer than Zth then the process branches to STEP 200.

Figure 18:
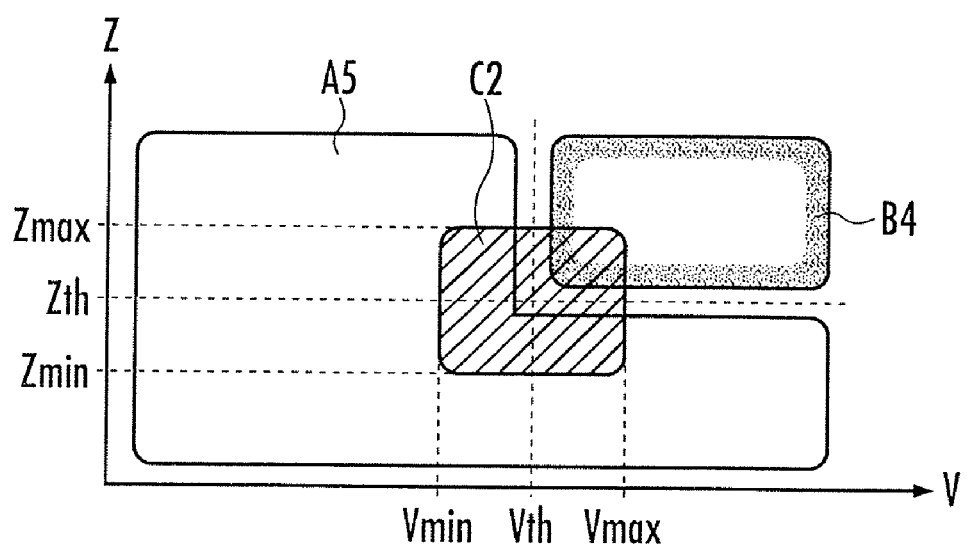
FIG. 18 illustrates an executing range of the detecting process for short range and the detecting process for long range in the fourth embodiment of the monitored object detecting process.

FIG. 18 shows the range in which the "detecting process for short range" and the "detecting process for long range" is executed in the fourth embodiment of the "monitored object detecting process" explained above, and the distance (z) between the object and the vehicle 10 is set as the axis of ordinate and the traveling speed (V) of the vehicle 10 is set as the axis of abscissa.

In FIG. 18, the "detecting process for short range" is executed when the distance Z between the object and the vehicle 10 is within the range of Zmin through Zmax taking Zth as the center, and also the velocity V of the vehicle 10 is at C2 within the range Vmin through Vmax taking Vth as center. Also, when it is determined that there is no possibility of contact between the object and the vehicle 10 by the "detecting process for short range", the "detecting process for long range" is also executed.

Further, only the "detecting process for short range" is executed within a range A5 comprised of: a range in which the velocity V of the vehicle 10 is equal to or less than Vmin; a range in which the distance Z between the object and the vehicle 10 is equal to or less than Zmin; a range in which the velocity V of the vehicle 10 is within Vmin through Vth and the distance Z between the object and the vehicle 10 exceeds Zmax; and a range in which the velocity V of the vehicle 10 exceeds Vmax and the distance Z between the object and the vehicle 10 is equal to or less than Zth.

Still further, only the "detecting process for long range" is executed with in a range B4 in which the velocity V of the vehicle 10 exceeds Vth and the distance Z between the object and the vehicle 10 is longer than Zth.

In the present embodiments, it is determined which of the "detecting process for short range" and the "detecting process for long range" is used to detect the monitored object on the basis of the distance between the object and the vehicle, or on the basis of the distance and the velocity of the vehicle. However, it may also be possible to determine which of the "detecting process for short range" and the "detecting process for long range" is used to detect the monitored object on the basis of the velocity of the vehicle only.

Further, in the present embodiments, there are disclosed a configuration in which the image ahead of the vehicle is taken. However, the possibility of contact with the object may be determined by taking images of other directions, such as a rear of the vehicle or a side of the vehicle.

Still further, in the present embodiments, the infrared cameras 2R, 2L are used as the imaging unit of the present invention. However, a visible camera taking visible images may also be used.

Still further, in the present embodiments, as the first distance calculating unit of the present invention, the one which calculates the distance between the vehicle and the object from the data of disparity of the two infrared cameras is indicated. However, it may also be of other configuration, such as calculating the distance with, for example, a milli-wave radar, a laser radar, and the like.

Still further, in the "detecting process for long range", even when the accuracy of the distance of the object itself in a long range is secured by the second distance calculating unit, it is difficult to conduct a detailed shape recognition of the object using distance information on the surroundings and the like. Therefore, the shape recognition of the object in a long range may be carried out by using different algorithms from that used in shape recognition of the object in a short range, such as a shape recognition algorithm based mainly on video characteristics and which does not use distance information, for example.

What is claimed is:

1. A vehicle environment monitoring apparatus which monitors an environment around a vehicle, using images obtained from at least one imaging unit mounted on the vehicle, comprising:
    an object extracting unit which extracts from the image an image area of an object in the real space;
    a first distance calculating unit which calculates a distance between the vehicle and the object; and
    a monitored object detecting unit which:
        determines the distance calculated by the first distance calculating unit to be a short range distance that is equal to or less than a predetermined distance or a long range distance that is longer than the predetermined distance,
        selects, as a selected algorithm, between a short range object detecting algorithm and a long range object detecting algorithm based on the determination of the distance being a short range distance or a long range distance, and
        detects an object having a possibility of coming into contact with the vehicle using the selected algorithm.

2. The vehicle environment monitoring apparatus according to claim 1, comprising:
    a disparity calculating unit which calculates a disparity between the image areas of the identical object extracted by the object extracting unit from each image taken at the same time by the two imaging units;
    a disparity rate of change calculating unit which calculates a disparity rate of change per predetermined time from the data of the disparity calculated in time series by the disparity calculating unit for the identical object in real space;

a velocity detecting unit which detects a velocity of the vehicle; and a second distance calculating unit which calculates the distance between the vehicle and the object on the basis of the disparity rate of change and the velocity of the vehicle;

wherein the first distance calculating unit calculates the distance between the vehicle and the object from the data of one disparity calculated by the disparity calculating unit; and the monitored object detecting unit detects the object having the possibility of coming into contact with the vehicle using the distance between the vehicle and the object calculated by the second distance calculating unit in the object detecting algorithm for long range.

3. The vehicle environment monitoring apparatus according to claim 1, wherein the monitored object detecting unit detects the object having the possibility of coming into contact with the vehicle by applying both of the object detecting algorithm for short range and the object detecting algorithm for long range, when a difference between the distance calculated by the first distance calculating unit and the predetermined distance is within a predetermined range.

4. The vehicle environment monitoring apparatus according to claim 1, comprising a velocity detecting unit for detecting a velocity of the vehicle, wherein the monitored object detecting unit detects the object having the possibility of coming into contact with the vehicle by applying the object detecting algorithm for short range when the detected velocity by the velocity detecting unit is equal to or slower than a predetermined velocity, and which detects the object having the possibility of coming into contact with the vehicle by applying the object detecting algorithm for long range when the detected velocity by the velocity detecting unit is faster than the predetermined velocity.

5. The vehicle environment monitoring apparatus according to claim 4, wherein the monitored object detecting unit detects the object having the possibility of coming into contact with the vehicle by applying both the object detecting algorithm for short range and the object detecting algorithm for long range, when a difference between the detected velocity by the velocity detecting unit and the predetermined velocity is within a predetermined range.

6. The vehicle environment monitoring apparatus according to claim 1, wherein the monitored object detecting unit continues the process by the object detecting algorithm for short range even when the detected distance by the first distance calculating unit becomes longer than the predetermined distance, when detecting the object having the possibility of coming into contact with the vehicle by applying the object detecting algorithm for short range to the image at a predetermined point in time.

7. The vehicle environment monitoring apparatus according to claim 1, wherein the monitored object detecting unit continues the process by the object detecting algorithm for long range even when the detected distance by the first distance calculating unit becomes equal to or less than the predetermined distance, when detecting the object having the possibility of coming into contact with the vehicle by applying the object detecting algorithm for long range to the image at a predetermined point in time.

8. The vehicle environment monitoring apparatus according to claim 1, wherein the short range object detection algorithm is targeted toward detecting a pedestrian or a bicycle as the object and the long range object detection algorithm is targeted toward detecting a large animal as the object.

9. A vehicle environment monitoring apparatus which monitors an environment around a vehicle, using images obtained from at least one imaging unit mounted on the vehicle, comprising:

an object extracting unit which extracts from the image an image area of an object in the real space;

a velocity detecting unit which detects a velocity of the vehicle; and a monitored object detecting unit which:
determines the vehicle to be moving with either a low velocity when the velocity of the vehicle is equal to or less than a predetermined velocity or high velocity when the velocity of the vehicle is greater than the predetermined velocity, selects, as a selected algorithm, between a short range object detecting algorithm when the vehicle is moving with said low velocity and a long range object detecting algorithm when the vehicle is moving with said high velocity, and detects an object having a possibility of coming into contact with the vehicle using the selected algorithm.

10. A vehicle environment monitoring apparatus which monitors an environment around a vehicle, using images obtained from at least one imaging unit mounted on the vehicle, comprising:

an object extracting unit which extracts from the image an image area of an object in the real space;

a first distance calculating unit which calculates a distance between the vehicle and the object; and a monitored object detecting unit which detects an object having a possibility of coming into contact with the vehicle using an object detecting algorithm for short range, when the distance calculated by the first distance calculating unit is equal to or less than a predetermined distance, and which detects the object having the possibility of coming into contact with the vehicle using an object detecting algorithm for long range, when the distance calculated by the first distance calculating unit is longer than the predetermined distance, wherein the monitored object detecting unit detects the object having the possibility of coming into contact with the vehicle by applying both of the object detecting algorithm for short range and the object detecting algorithm for long range, when a difference between the distance calculated by the first distance calculating unit and the predetermined distance is within a predetermined range.

11. The vehicle environment monitoring apparatus according to claim 10, comprising:

a disparity calculating unit which calculates a disparity between the image areas of the identical object extracted by the object extracting unit from each image taken at the same time by the two imaging units;

a disparity rate of change calculating unit which calculates a disparity rate of change per predetermined time from the data of the disparity calculated in time series by the disparity calculating unit for the identical object in real space;

a velocity detecting unit which detects a velocity of the vehicle; and a second distance calculating unit which calculates the distance between the vehicle and the object on the basis of the disparity rate of change and the velocity of the vehicle;

wherein the first distance calculating unit calculates the distance between the vehicle and the object from the data of one disparity calculated by the disparity calculating unit; and the monitored object detecting unit detects the object having the possibility of coming into contact with the vehicle using the distance between the vehicle and the object calculated by the second distance calculating unit in the object detecting algorithm for long range.

12. The vehicle environment monitoring apparatus according to claim 10, comprising a velocity detecting unit for detecting a velocity of the vehicle, wherein the monitored object detecting unit detects the object having the possibility of coming into contact with the vehicle by applying the object detecting algorithm for short range when the detected velocity by the velocity detecting unit is equal to or slower than a predetermined velocity, and which detects the object having the possibility of coming into contact with the vehicle by applying the object detecting algorithm for long range when the detected velocity by the velocity detecting unit is faster than the predetermined velocity.

13. The vehicle environment monitoring apparatus according to claim 12, wherein the monitored object detecting unit detects the object having the possibility of coming into contact with the vehicle by applying both the object detecting algorithm for short range and the object detecting algorithm for long range, when a difference between the detected velocity by the velocity detecting unit and the predetermined velocity is within a predetermined range.

14. The vehicle environment monitoring apparatus according to claim 10, wherein the monitored object detecting unit continues the process by the object detecting algorithm for short range even when the detected distance by the first distance calculating unit becomes longer than the predetermined distance, when detecting the object having the possibility of coming into contact with the vehicle by applying the object detecting algorithm for short range to the image at a predetermined point in time.

15. The vehicle environment monitoring apparatus according to claim 10, wherein the monitored object detecting unit continues the process by the object detecting algorithm for long range even when the detected distance by the first distance calculating unit becomes equal to or less than the predetermined distance, when detecting the object having the possibility of coming into contact with the vehicle by applying the object detecting algorithm for long range to the image at a predetermined point in time.

16. The vehicle environment monitoring apparatus according to claim 10, wherein the short range object detection algorithm is targeted toward detecting a pedestrian or a bicycle as the object and the long range object detection algorithm is targeted toward detecting a large animal as the object.

* * * * *